(12) United States Patent
Chung et al.

(10) Patent No.: US 8,599,864 B2
(45) Date of Patent: Dec. 3, 2013

(54) TRANSIT SWITCHES IN A NETWORK OF LOGICAL SWITCHES

(75) Inventors: Daniel Ji Yong Park Chung, San Jose, CA (US); Badrinath Kollu, San Jose, CA (US); Sathish Kumar Gnanasekaran, Sunnyvale, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 1001 days.

(21) Appl. No.: 12/575,610

(22) Filed: Oct. 8, 2009

(65) Prior Publication Data

US 2011/0085559 A1    Apr. 14, 2011

(51) Int. Cl.
*H04W 4/00* (2009.01)
*H04L 12/28* (2006.01)

(52) U.S. Cl.
USPC .................. 370/401; 370/328; 370/395.1

(58) Field of Classification Search
None
See application file for complete search history.

(56) References Cited

U.S. PATENT DOCUMENTS

2004/0028050 A1*  2/2004  Proctor ............... 370/395.1
2007/0091903 A1*  4/2007  Atkinson ............. 370/401

OTHER PUBLICATIONS

"Fibre Channel Inter-Fabric Routing (FC-IFR) Rev 1.03"; INCITS working draft proposed American National Standard for Information Technology; Aug. 3, 2008.
"Fibre Channel Switch Fabric—4 (FC-SW-4) Rev 7.8"; INCITS working draft proposed American National Standard for Information Technology; Apr. 4, 2006.

* cited by examiner

*Primary Examiner* — Faruk Hamza
*Assistant Examiner* — Diane Lo
(74) *Attorney, Agent, or Firm* — Wong, Cabello, Lutsch, Rutherford & Brucculeri, L.L.P.

(57) ABSTRACT

A Layer 2 network switch is partitionable into a plurality of switch fabrics. The single-chassis switch is partitionable into a plurality of logical switches, each associated with one of the virtual fabrics. The logical switches behave as complete and self-contained switches. A logical switch fabric can span multiple single-chassis switch chassis. Logical switches are connected by inter-switch links that can be either dedicated single-chassis links or logical links. An extended inter-switch link can be used to transport traffic for one or more logical inter-switch links. Physical ports of the chassis are assigned to logical switches and are managed by the logical switch. Legacy switches that are not partitionable into logical switches can serve as transit switches between two logical switches.

18 Claims, 35 Drawing Sheets

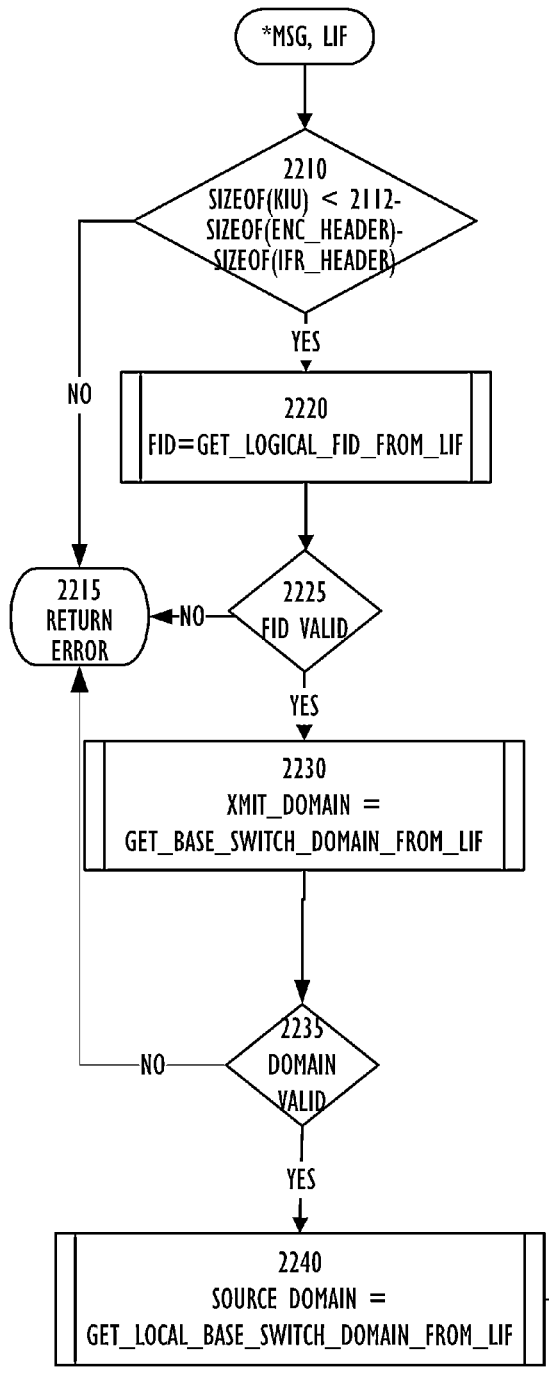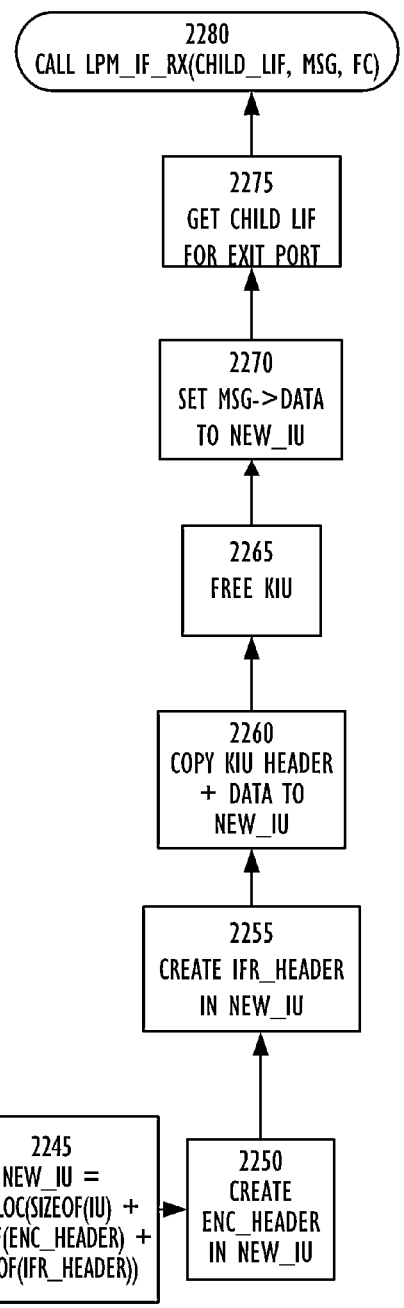
FIG. 22

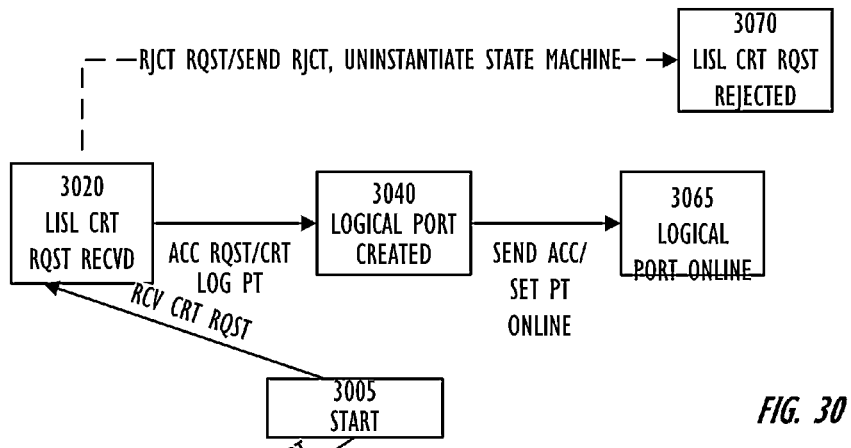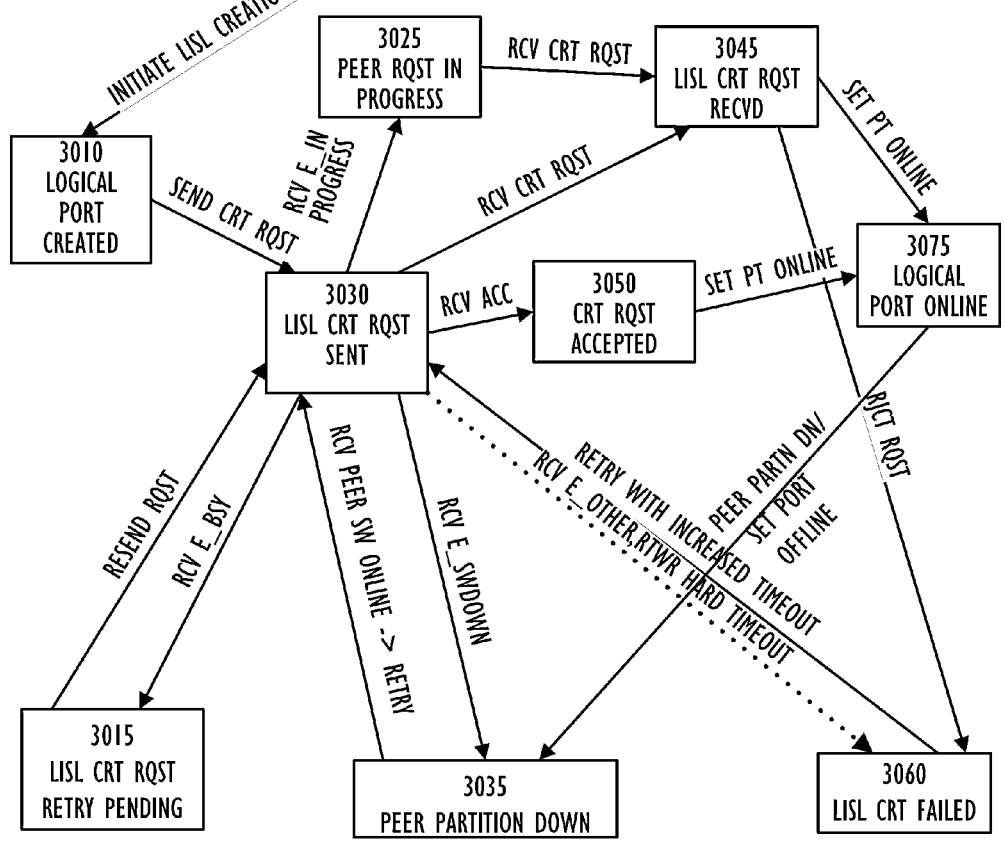
FIG. 30

TRANSIT SWITCHES IN A NETWORK OF LOGICAL SWITCHES

TECHNICAL FIELD

The present invention relates to the field of network fabric virtualization and in particular to virtualization of network fabrics through virtualization of switches.

BACKGROUND ART

Switch-based network fabrics have been a major part of the development of storage area networks (SANs) in modern networking environments. Scalability of large Layer 2 (L2) fabrics has become a problem, as end users require ever-larger L2 fabrics, while also desiring consolidation of SAN islands and better tools for managing increasingly more complex SANs and other switch-based fabrics.

SUMMARY OF INVENTION

According to one embodiment, a method of connecting logical switches in a network comprises partitioning a first switch into a first plurality of logical switches, partitioning a second switch into a second plurality of logical switches, creating a first inter-switch link between a first logical switch of the first plurality of logical switches and a third switch, wherein the third switch is not partitionable into logical switches.

According to another embodiment, a network of switches comprises a first network switch and a second network switch, each comprising a plurality of logical switches, a transit network switch, a logical inter-switch link defined between the a third logical switch of the plurality of logical switches of the first network switch and a fourth logical switch of the plurality of logical switches of the second network switch, a first extended inter-switch link, connected between a first logical switch of the plurality of logical switches of the first network switch and the transit network switch, configured to provide transport of data for the logical inter-switch link between the first network switch and the transit network switch, and a second extended inter-switch link, connected between a second logical switch of a plurality of logical switches of the second network switch and the transit network switch, configured to provide transport of data for the logical inter-switch link between the second network switch and the transit network switch.

According to yet another embodiment, a computer readable medium stores software for managing a network switch, the software for instructing a processor of the network switch to perform actions comprising partitioning a first switch into a first plurality of logical switches, partitioning a second switch into a second plurality of logical switches, creating a first inter-switch link between a first logical switch of the first plurality of logical switches and a third switch, wherein the third switch is not partitionable into logical switches.

BRIEF DESCRIPTION OF DRAWINGS

The accompanying drawings, which are incorporated in and constitute a part of this specification, illustrate an implementation of apparatus and methods consistent with the present invention and, together with the detailed description, serve to explain advantages and principles consistent with the invention. In the drawings.

FIG. 22 is a flowchart illustrating one embodiment of a technique for encapsulating a frame traveling across a logical inter-switch link (LISL);

FIG. 30 is a block diagram illustrating an example state machine used in one embodiment for the creation of a logical inter-switch link;

The figures depict embodiments of the present invention for purposes of illustration only. One skilled in the art will readily recognize from the following discussion that alternative embodiments of the structures and methods illustrated herein may be employed without departing from the principles of the invention described herein.

DESCRIPTION OF EMBODIMENTS

In the following description, for purposes of explanation, numerous specific details are set forth in order to provide a thorough understanding of the invention. It will be apparent, however, to one skilled in the art that the invention can be practiced without these specific details. In other instances, structure and devices are shown in block diagram form in order to avoid obscuring the invention. References to numbers without subscripts are understood to reference all instance of subscripts corresponding to the referenced number. Moreover, the language used in this disclosure has been principally selected for readability and instructional purposes, and may not have been selected to delineate or circumscribe the inventive subject matter, resort to the claims being necessary to determine such inventive subject matter.

Although some of the following description is written in terms that relate to software or firmware, embodiments can implement the features and functionality described herein in software, firmware, or hardware as desired, including any combination of software, firmware, and hardware. References to daemons, drivers, engines, modules, or routines should not be considered as suggesting a limitation of the embodiment to any type of implementation.

Figure 1:
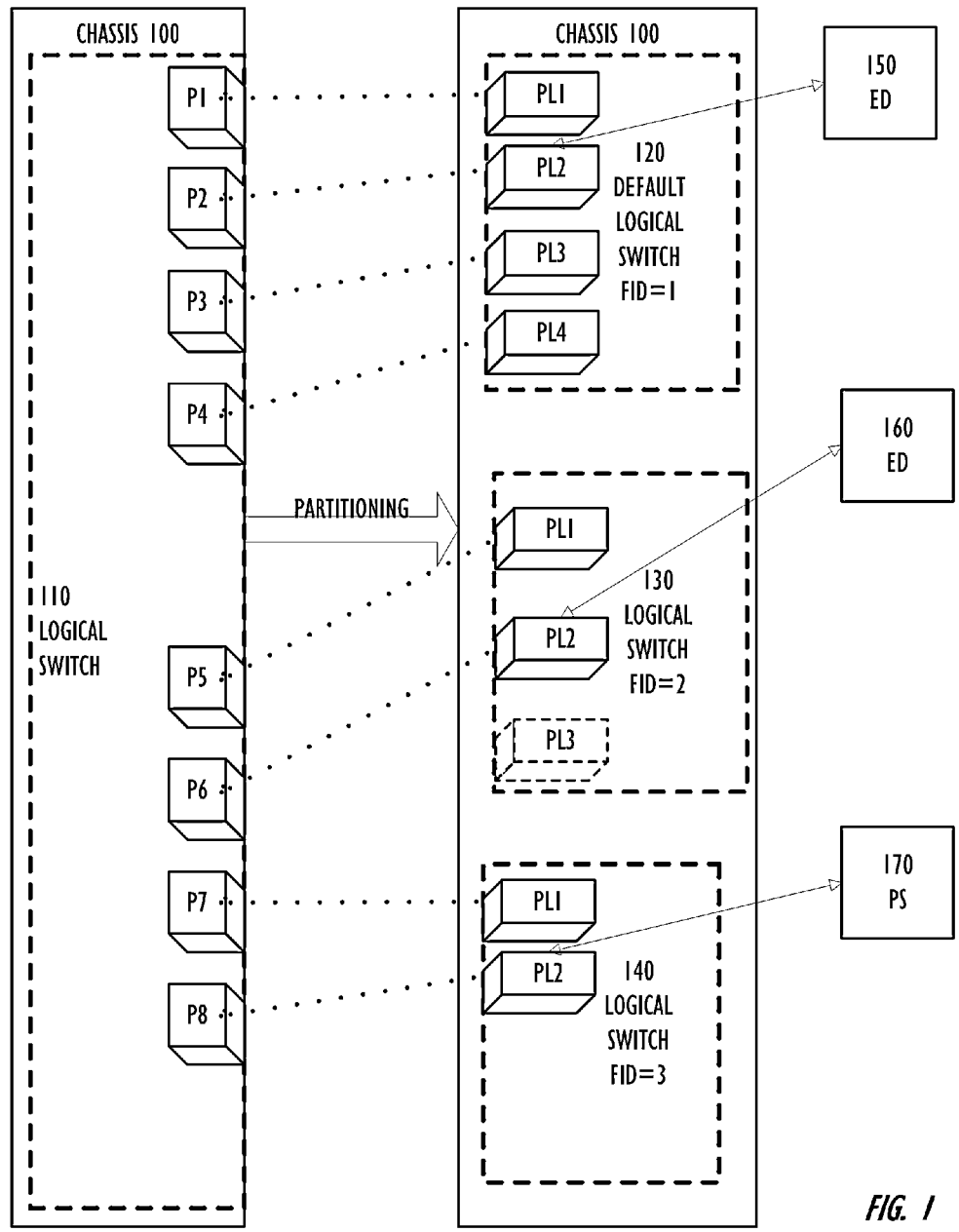
FIG. 1 is a block diagram illustrating a high-level of one embodiment of partitioning a chassis into logical switches.

FIG. 1 illustrates one example of partitioning a switch in a single chassis into multiple logical switches. Although the following description is set forth in the context of a Fibre Channel (FC) switch chassis, the present invention is not limited to Fibre Channel technology and could be implemented in other types of switched-based fabrics. Furthermore, "fiber" is used throughout this description as a generic term that can indicate either an optical or a copper cable.

Chassis 100 is an embodiment of a Fibre Channel switch chassis. In a default configuration, the entire switch can be considered as a single logical switch 110. According to the embodiments described herein, the switch of chassis 100 can be partitioned into multiple logical switches, illustrated in FIG. 1 as logical switches 120, 130, and 140. Although this example and many of the following examples of partitioning show partitioning a switch into three logical switches, the cardinality of the partitioning is illustrative only and limited to a small number of logical switches for clarity of the drawings.

Each logical switch 120, 130, and 140 acts as a single Fibre Channel switch, with a collection of zero or more user visible ports. Each logical switch 120, 130, and 140 can support at least E, F, and FL ports, as those port types are defined by the Fibre Channel standards. Each logical switch 120, 130, and 140 behaves as a complete and self-contained FC switch, with fabric services, configuration, and all fabric characteristics associated with a physical FC switch. Logical switch 120 is designated in FIG. 1 as a default logical switch. In one embodiment, all switch ports not assigned to other logical switches, such as logical switches 130 and 140, are assigned to the default logical switch 120. If the chassis 100 is configured with only one logical switch 110, then logical switch 110 is considered the default logical switch and all ports are considered part of logical switch 110.

Management of chassis 100 is performed as management of a collection of logical switches, whether there is only one logical switch 110 or a plurality of logical switches 120, 130, and 140. Some chassis management functions, for example, the partition configuration management, span logical switch boundaries, but users can separately manage logical switches independently.

In addition to partitioning a chassis into logical switches, the logical switches are assigned to virtual fabrics, also known as logical fabrics. In one embodiment, each logical switch is assigned to a different virtual fabric, and only one logical switch can be associated with a virtual fabric in a particular chassis. A virtual fabric can be a single-chassis virtual fabric, or can span multiple chassis, which allows creating multi-chassis virtual fabrics comprised of logical switches in different chassis. In the following disclosure, references to a fabric should be understood as a reference to a virtual fabric unless otherwise stated.

Embodiments of chassis management functions related to partitioning the chassis into virtual switches include the ability to create a logical switch, assigning the logical switch to a virtual fabric, adding ports to the logical switch, deleting ports from the logical switch, deleting the logical switch, and changing the assignment of the logical switch to a different virtual fabric. In some embodiments, security constraints can be placed on the chassis management functions, such as requiring permission to effect any chassis management operations. Additionally, users can be given rights to control one virtual fabric in a chassis, but not another.

Physical ports on the chassis are assigned to logical switches. Chassis management functions allow moving ports between logical switches in one embodiment, forcing a port offline when moved from one logical switch to another. In one embodiment, a logical switch with zero ports assigned to it is automatically deleted.

Because physical ports are assigned to logical switches, the concept of a user port is introduced. A user port is a port assigned to a logical switch and bound to a physical port. Each logical switch has its own port index, but unlike a conventional switch without logical switches, the port index values are associated with a user port number, and depending on the configuration of the chassis, may not be the same as the physical port number. FC addresses include the user port number and are dynamically allocated when a port is assigned to a logical switch. In one embodiment, FC addresses are not unique across logical switches, because user port numbers are not unique across logical switches. In one embodiment, physical and user port numbers within a chassis do not change, regardless of the logical switch to which the port is assigned. Therefore, when a port is moved from one logical switch to another, both physical and user port numbers stay unchanged. In that embodiment, the port indexes are assigned at the time of being added to a logical switch and are assigned sequentially. When a port is removed from the logical switch, the port index slot becomes free.

Returning to FIG. 1, the example physical switch 100 is illustrated with eight physical ports, designated P1 through P8. In embodiments of such a switch, the physical ports P1 through P8 are typically implemented on one or more edge switch ASICs of the physical switch 100 that are internally connected to core switches for intra-chassis data traffic. The edge switches are not managed independently and are transparent to any external devices connected to the switch 100, so the division into edge switches is not significant for the purpose of this application and is not shown in FIG. 1. For purposes of clarity of the example drawing of FIG. 1, only eight physical ports on the switch 100 are shown, although such switches typically have 16 or more ports, and may have any number of desired ports.

According to embodiments described below, the physical switch 100 illustrated in FIG. 1 is partitioned into three logical switches 120, 130, and 140, each of which is assigned to a different virtual fabric, illustrated as fabrics 1, 2, and 3 in FIG. 1, as indicated by the Fabric Identification (FID) value. Logical switch 120 is shown as having a different number of ports than either logical switch 130 or 140. Physical ports can be assigned to the logical switches 120, 130, and 140 by configuring the logical switches. Although only three logical switches are shown in FIG. 1, actual implementations of the physical switch can typically be partitioned into other numbers of logical switches as desired by the switch operator.

As illustrated in FIG. 1 and described in more detail below, physical switch 100 is partitioned so that physical port P1 is assigned as physical port PL1 to logical switch 120. Physical ports P2, P3, and P4 are assigned to logical switch 120 as physical ports PL2, PL3, and PL4. Physical ports P5, P6, P7, and P8 are assigned to logical switches 130 and 140. When external device 150 connects to port PL2 of logical switch 120, it connects to the same physical port designated P2 in the unpartitioned switch 100, but the port is managed in logical switch 120 by controlling the logical switch port PL2.

Similarly, physical ports P5 and P6 are assigned to logical switch 130 as ports PL1 and PL2 of logical switch 130 and physical ports P7 and P8 are assigned to logical switch 140 as ports PL1 and PL2. Because the logical switches 120, 130, and 140 are managed independently, in some embodiments, each can have ports identified using the same port numbers as each other logical switch. As shown in FIG. 1, external device 160 is logically connected to port PL2 of logical switch 130 (the same port number as port PL2 of logical switch 120), which is port P6 of the unpartitioned physical switch 100.

As described below, the ports of logical switches 120, 130, and 140 are connected to external devices or can be connected to ports of other switches of other chassis in the same virtual fabric through inter-switch links, which can be dedicated physical links connecting physical switch 100 to another physical switch, or logical links that use the services of other physical links to carry the traffic across the logical link. The other chassis need not be capable of partitioning into logical switches. Port PL3 of logical switch 130 is a logical port not directly associated with any physical port that is used for such logical links, with logical port PL3 connected via a logical link that traverses port PL2 of logical switch 140 and a physical link to switch 170 to a logical port of a logical switch of switch 170, as is described in more detail below. The partitioning shown in FIG. 1, including port and fabric numbers, is by way of example and illustrative only and the physical switch 100 can be configured with other partitioning as desired.

Figure 2:
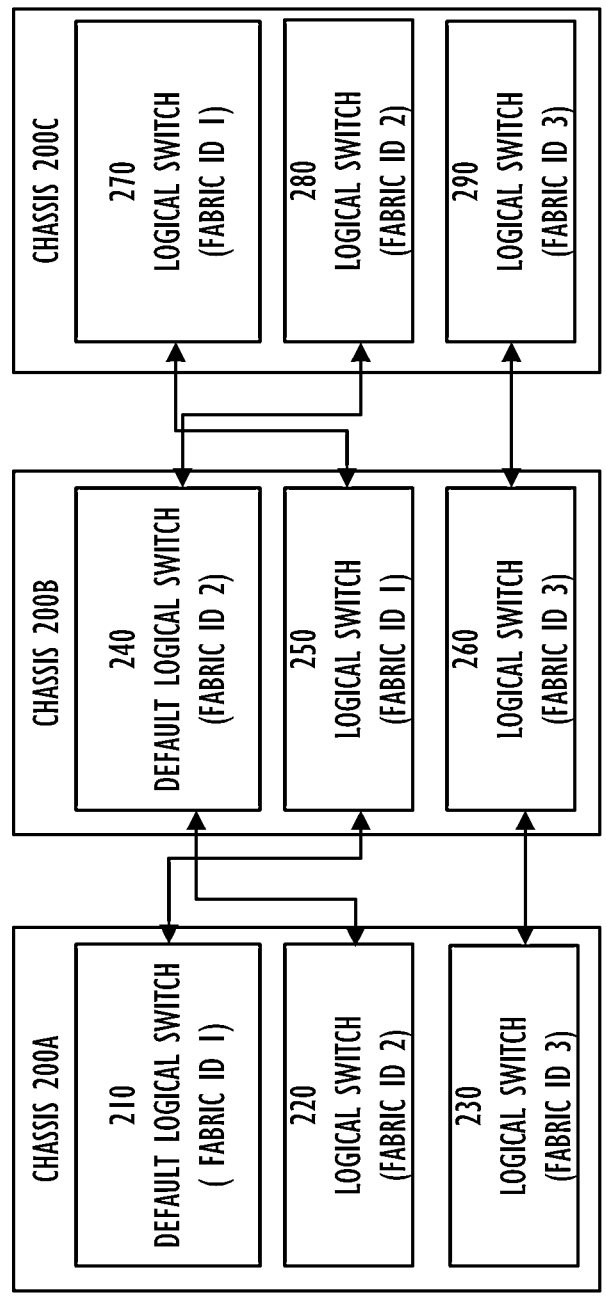
FIG. 2 is a block diagram illustrating an example of a plurality of logical switches organized into a plurality of virtual fabrics.

FIG. 2 is an example of a collection of chassis 200 partitioned into three virtual fabrics, with each virtual fabric spanning the collection of chassis 200. In this example, logical switches 210, 250, and 270 are all part of a first virtual fabric, and are given an FID of 1. Logical switches 220, 240, and 280 are part of a second virtual fabric, and are given FID 2. Logical switches 230, 260, and 290 are part of a third virtual fabric, and are assigned FID 3. Inter-switch links (ISLs) are defined among the logical switches in each virtual fabric as is described in more detail below. The fabric IDs illustrated in FIG. 2 and other figures discussed below are illustrative and only for example. Any desired technique for identifying fabrics can be used.

A base fabric is a routable network that carries traffic for multiple virtual fabrics. A base fabric is formed by connecting specially designated logical switches from each chassis. These special logical switches are called base switches. ISLs within the base fabric are called eXtended ISLs (XISLs). XISLs are, by default, shared by all virtual fabrics, although sharing can be limited to one or more fabrics to provide quality of service (QoS). Logical links created between logical switches across the base fabric are called Logical ISLs (LISLs). LISLs represent reachability between logical switches across a base fabric and are not related to XISL topology. A base fabric can also contain legacy L2 switches since multi-fabric traffic is carried using encapsulated headers, as discussed in more detail below.

ISLs connected to a physical port of a non-base switch are called Dedicated ISLs (DISLs). These DISLs are dedicated to a particular logical switch and only carry traffic for a virtual fabric associated with the logical switch. In other word, E_ports associated with a base switch form XISLs, while E_ports associated with a non-base switch form DISLs. If an XISL is shared by one fabric, it still carries protocol traffic associated with multiple fabrics, in addition to carrying data traffic for just one fabric. In some embodiments, a base fabric can also be configured to have DISLs. For example, a non-base switch can be used within a base fabric to connect two base switches. In such case, a DISL is carrying traffic within the base fabric, which is multi-fabric by nature.

Preferably, a base fabric is kept unburdened with unnecessary configuration and protocols, so that the chance of segmenting or disrupting the shared resource is minimized. Thus, in one embodiment, F_ports within a base fabric are prohibited. In other embodiments, F_ports can be in a base fabric as required for legacy configuration support and migration.

Figure 3:
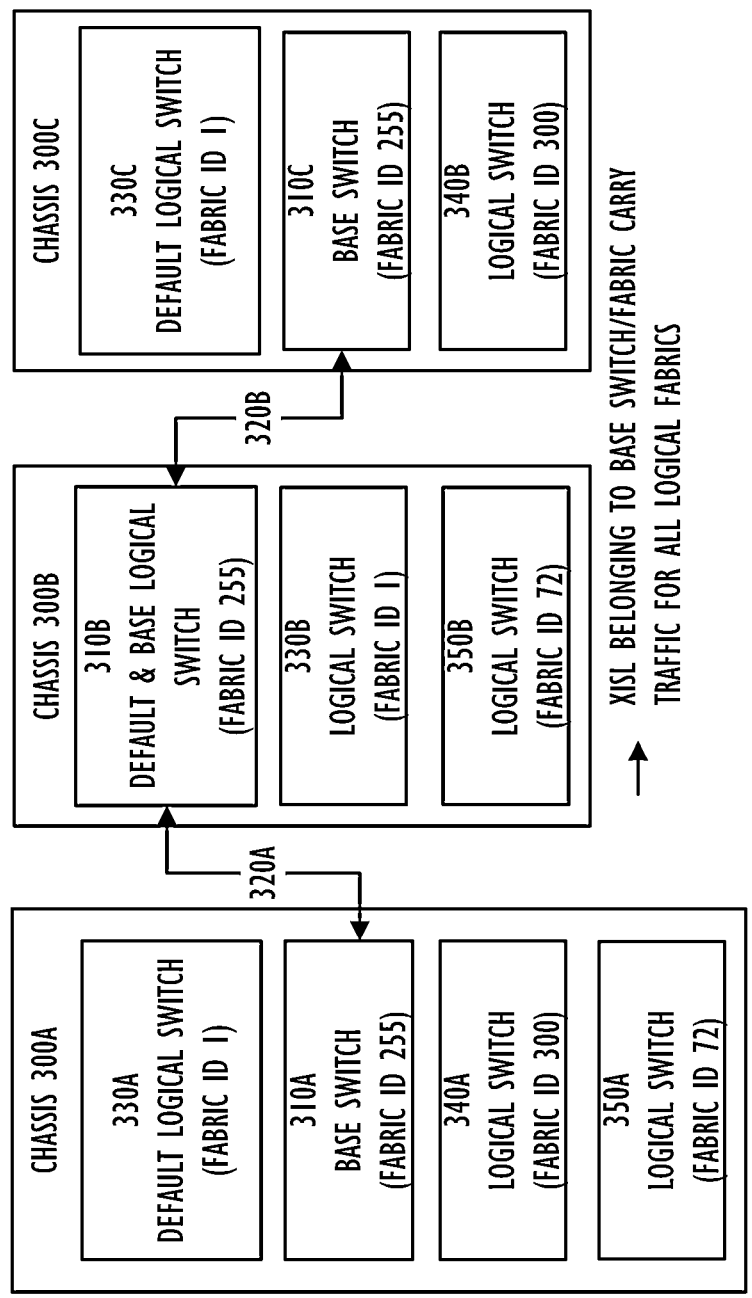
FIG. 3 is a block diagram illustrating another example of a plurality of logical switches organized into a plurality of virtual fabrics.

ISLs to link logical switches in a virtual fabric can be either direct links between logical switches, or can be LISLs defined over XISLs. In the latter situation, illustrated in FIG. 3, logical switches 310 are configured in each chassis 300 as base logical switches. ISLs 320 are defined to connect the base logical switches 310 into a single fabric, here given FID 255. The base logical switches 310 are logical switches, and can be, but do not have to be, the default logical switch for their respective chassis 300. The ISLs 320 are configured as XISLs, which can be shared to carry traffic for multiple fabrics. Thus, the logical switches 330 that are assigned an FID of 1 in the example of FIG. 3 would communicate with each other by routing traffic to the base logical switch 310, and then to other logical switches 330 across the XISLs 320 using a logical link (not shown in FIG. 3) between the logical switches 330 as disclosed below.

Figure 4:
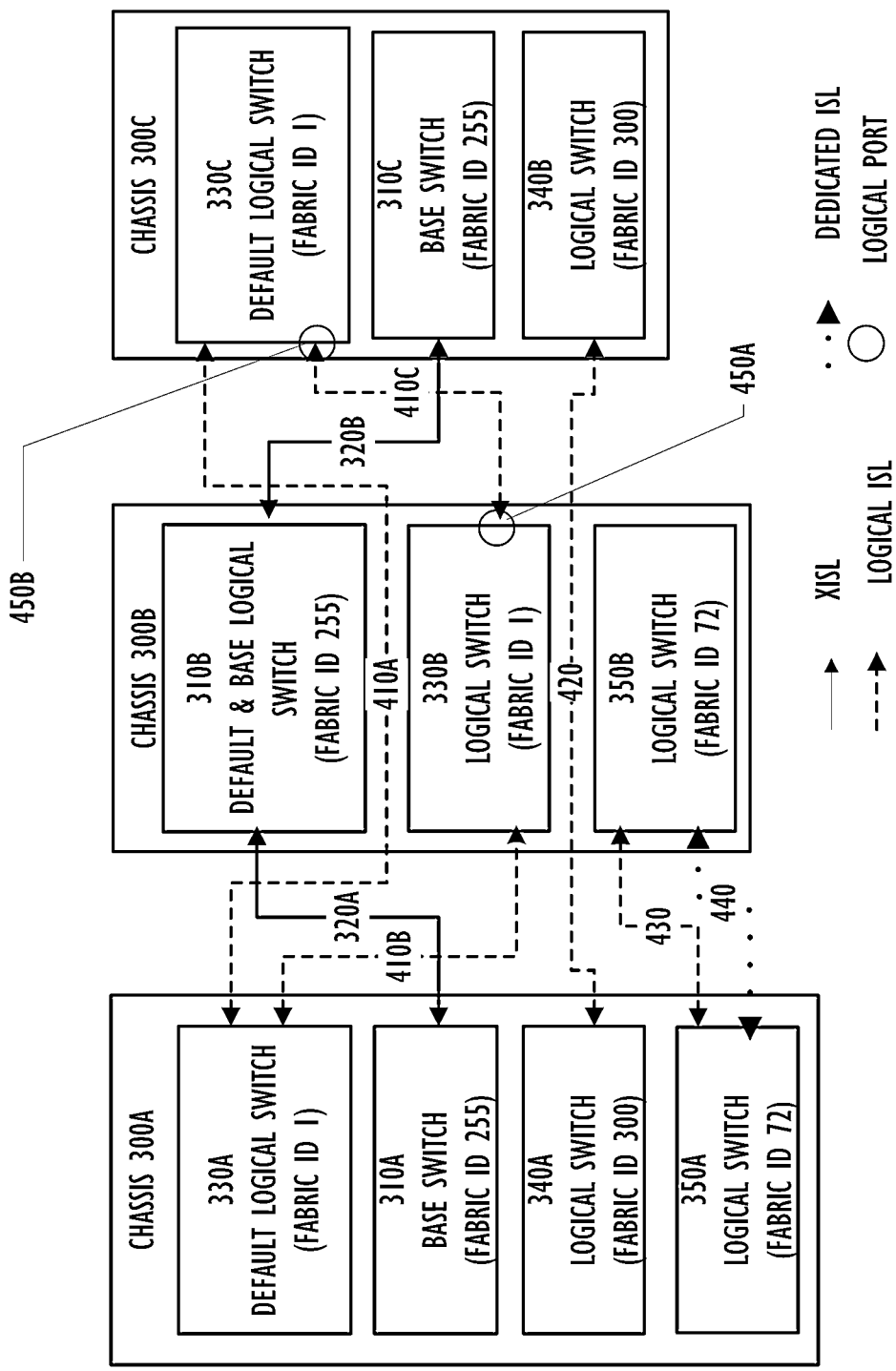
FIG. 4 is a block diagram illustrating inter-switch links between the logical switches of FIG. 3.

Alternately, logical switches in a virtual fabric can use DISLs to communicate directly with other logical switches in the same virtual fabric. FIG. 4 illustrates one example of such a configuration, with both LISLs and DISLs. As in FIG. 3, XISLs 320 connect logical switches 310 that are assigned FID 255. But now, LISLs 410 connect the logical switches 330 that are assigned FID 1, LISLs 420 connect the logical switches 340 that are assigned FID 300, and LISLs 430 connects the logical switches 350 that are assigned FID 72. LISLs are a logical representation for a connection through a base fabric between two logical switches in a virtual fabric. A LISL behaves like a regular E_port-connected ISL, allowing FC services over LISLs. Traffic for LISLs 420, 420, and 430 all traverse the logical switches 310 and XISLs 320, which are shared between the virtual fabrics assigned FIDs 1, 300, and 72.

As shown in FIG. 4, a virtual fabric can have both dedicated ISL (DISLs) and LISLs. For example, DISL 440 connects logical switches 350, in addition to LISLs 430.

DISL 440 connects physical E_ports that are assigned to logical switches 350, allowing an ISL for the exclusive use of traffic within the virtual fabric identified with FID 72. LISLs connect to logical switches through logical ports, such as the logical ports 450 that connect LISL 410c between logical switches 330b and 330c.

Figure 5:
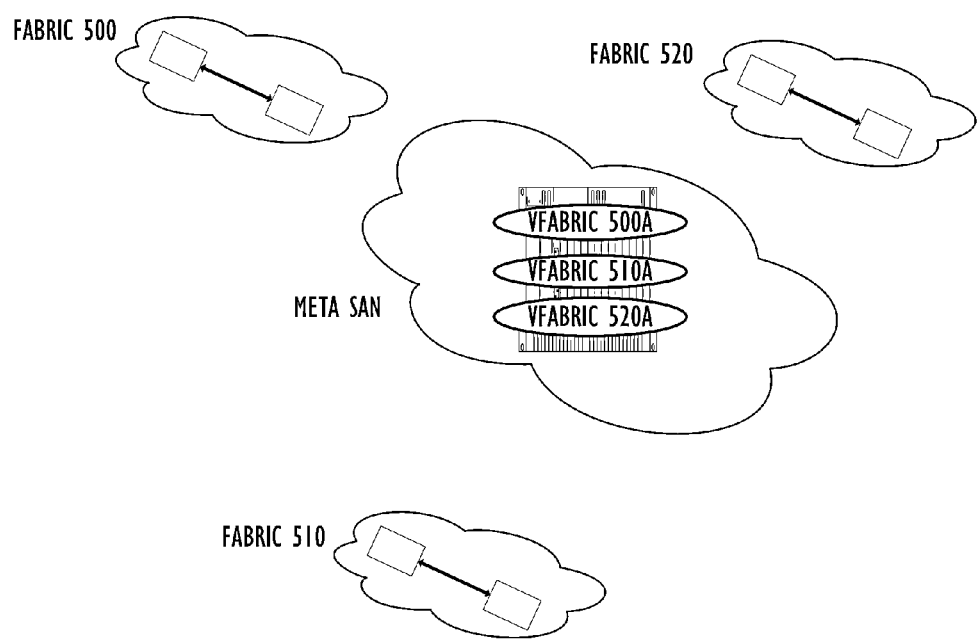
FIG. 5 is a block diagram illustrating one use of partitioning a chassis into logical switches.
Figure 6:
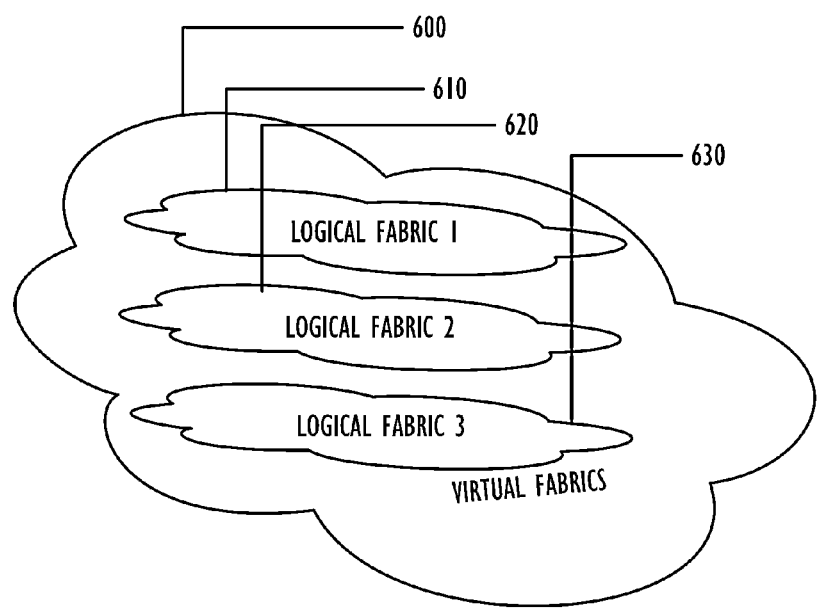
FIG. 6 is a block diagram illustrating one use of partitioning a fabric into virtual fabrics.
Figure 7:
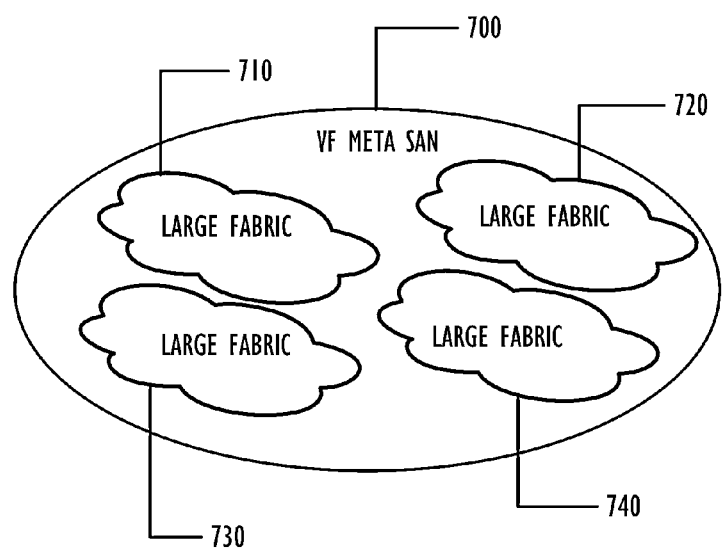
FIG. 7 is a block diagram illustrating a virtual fabric Meta Storage Area Network (Meta SAN)

FIGS. 5, 6, and 7 illustrate some advantages of using virtual fabrics as disclosed herein. FIG. 5 illustrates consolidation of fabrics. Individual fabrics 500, 510, and 520 are consolidated into a Meta SAN using corresponding virtual fabrics 500a, 510a, and 520a. FIG. 6 illustrates that partitioning a single fabric 600 into three virtual fabrics 610, 620, and 630. Traffic in each of the virtual fabrics 610, 620, and 630 is managed separately from and isolated from traffic in each of the other virtual fabrics partitioned from fabric 600. FIG. 7 illustrates the concept of creating a virtual fabric Meta SAN 700, by combining single-chassis fabrics 710, 720, 730, and 740 into the multi-chassis virtual fabric 700. Each virtual fabric can grow independently subject only to chassis limitations, and selected connectivity can be established across virtual fabrics through routing.

Figure 8:
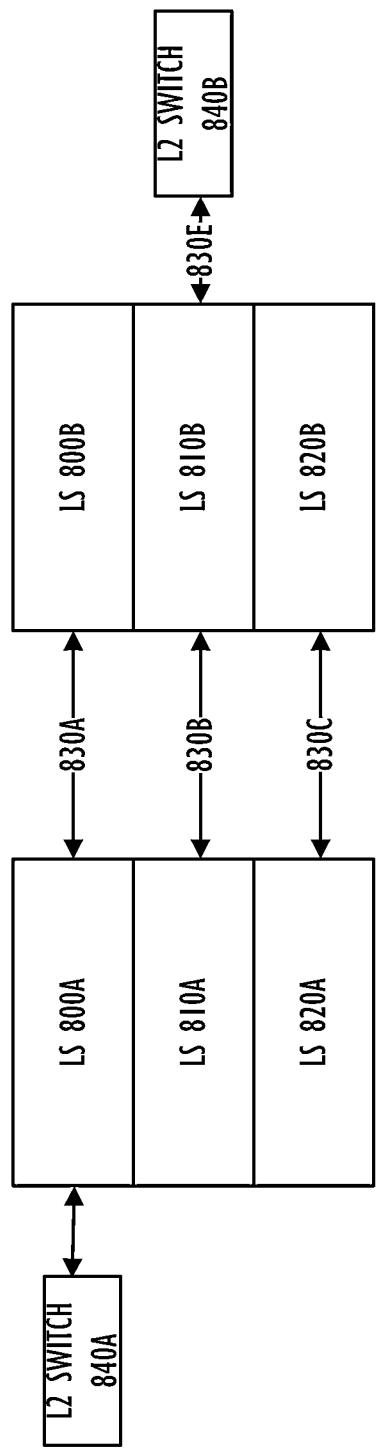
FIG. 8 is a block diagram illustrating using dedicated inter-switch links to connect logical switches in a two-chassis embodiment.
Figure 9:
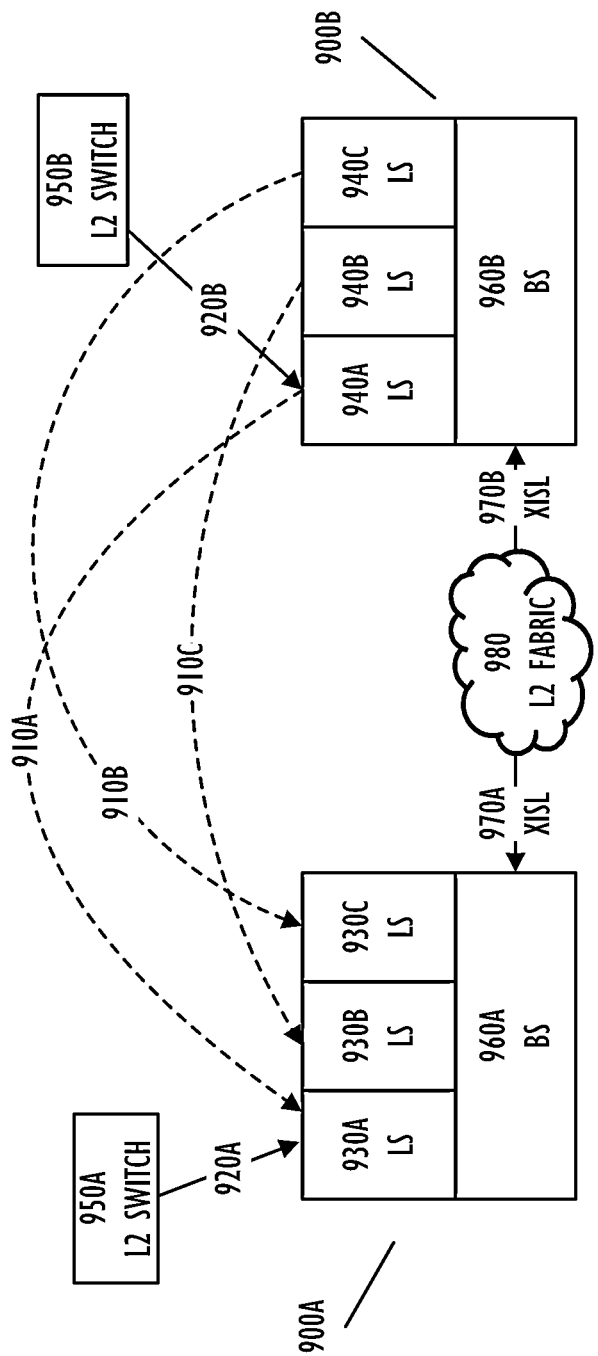
FIG. 9 is a block diagram illustrating using logical inter-switch links to connect logical switches in a two-chassis embodiment.

FIGS. 8 and 9 illustrate two ways to connect virtual fabrics. In FIG. 8, DISLs 830 connect logical switches 800, 810, and 820 in different chassis, using normal E_ports. As illustrated in FIG. 8, legacy L2 switches 840 that cannot be partitioned into logical switches and virtual fabrics can be made part of a virtual fabric by connecting them with DISLs to a virtual fabric. These are examples only, and other techniques, including mixtures of LISLs and DISLs, can be used, as illustrated above in FIG. 4. FIG. 9 illustrates using LISLs 910 to connect logical switches 930 in chassis 900a with logical switches 940 of chassis 900b to form multi-chassis virtual fabrics, via base logical switches 960. Base logical switches 960 are connected with XISLs 970 through another L2 fabric 980, which can be a legacy L2 switch and does not have to be capable of configuration with logical switches or virtual fabrics. In addition, legacy L2 switches 950 are connected to logical switches 930 and 940 using DISLs 920, creating multi-chassis virtual fabrics with the logical switches 930 and 940, even though legacy L2 switches 950 are not virtual fabric-capable.

If two logical switches within a virtual fabric are reachable through the base fabric of that chassis, a LISL connects them together. LISL connectivity is not affected by the underlying XISL configuration. If two logical switches are no longer reachable through the base fabric, the LISL connecting the logical switches is taken offline. All logical switches within a virtual fabric are typically fully connected to one another in full mesh topology.

As shown above, DISLs can also be used addition to LISLs. For example, if there are three DISLs between two logical switches along with three XISLs, four ISLs are seen from the L2 protocol perspective: three DISLs and one LISL. Some embodiments can provide support for only DISLs, while other embodiments can provide also provide support for LISLs and XISLs, in addition to DISLs.

If a LISL needs to be brought up, a virtual fabric protocol first allocates a logical port through the help of infrastructure and associates the logical port with a logical switch. A port online event is generated to the logical switch to start the process of bringing up the LISL connected at the logical port. Logical switch operations on the logical port and the logical ISL are performed without being aware of the logical nature of the entities. A LISL can be taken down by setting the logical port in an offline state, or de-allocated explicitly by the virtual fabric protocol.

Figure 10:
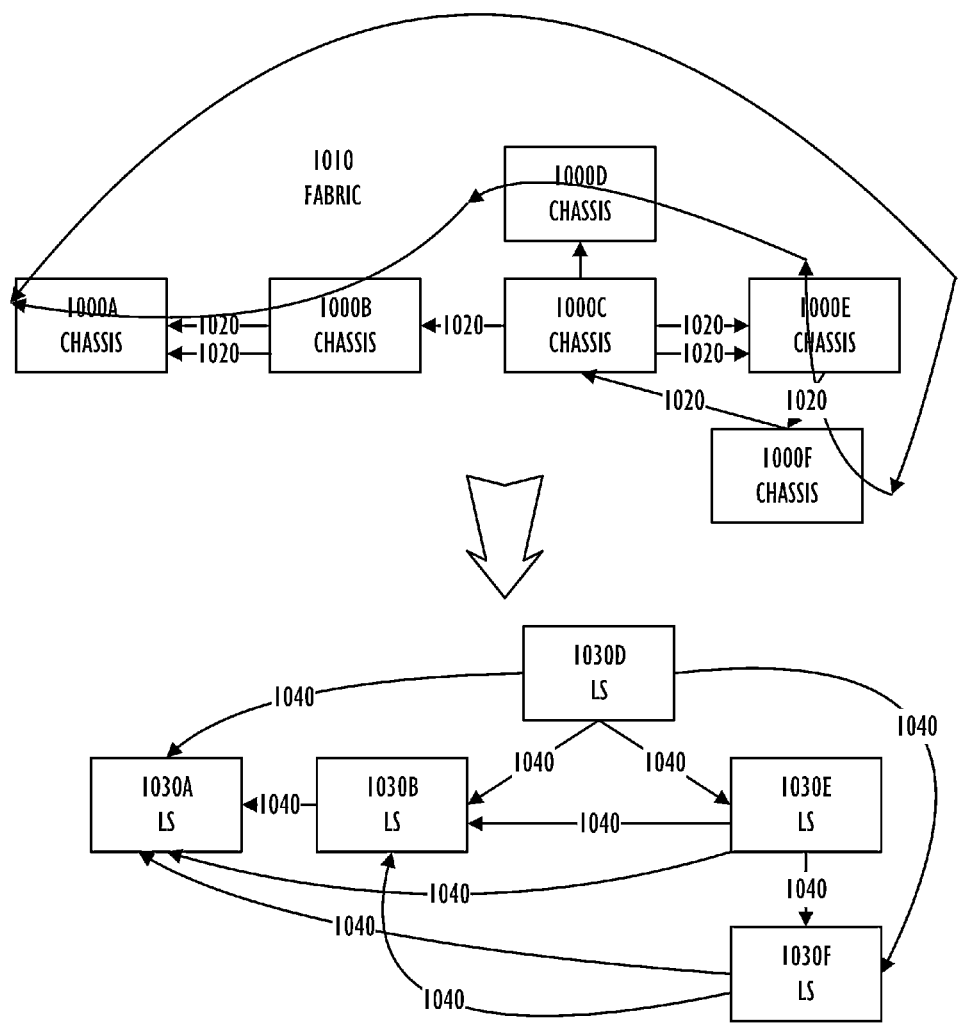
FIG. 10 is a block diagram illustrating a logical topology connecting logical switches in a multi-chassis embodiment.

FIG. 10 depicts conversion from physical connectivity to a virtual fabric topology. Five chassis 1000 are connected in the top picture with virtual fabric 1010 built out of chassis 1000a, 1000b, 1000d, 1000e, and 1000f. All links 1020 are XISLs. The bottom picture shows the virtual fabric topology of the top picture where all logical switches 1030 are connected in an all-to-all topology. Even though there are two XISLs 1020 between chassis 1000a and chassis 1000b, there is only one LISL 1040 between logical switch 1030a logical switch 1030b. In other embodiments, multiple LISLs can connect two logical switches. In terms of hardware programming, chassis 1000c, which is not part of the virtual fabric 1010 does not require any route programming for virtual fabric 1010 and is not required to be virtual fabric capable.

In one embodiment, a chassis running a virtual fabric-capable FC protocol can be configured to be one or more logical switches without the need of enabling other virtual fabric features, such as device sharing or virtual fabric. Each logical switch can be treated as normal L2 switches and can be used in a user environment just as legacy L2 switches. If desired, the virtual fabric capability can be enabled to expand the legacy L2 fabric.

Figure 11:
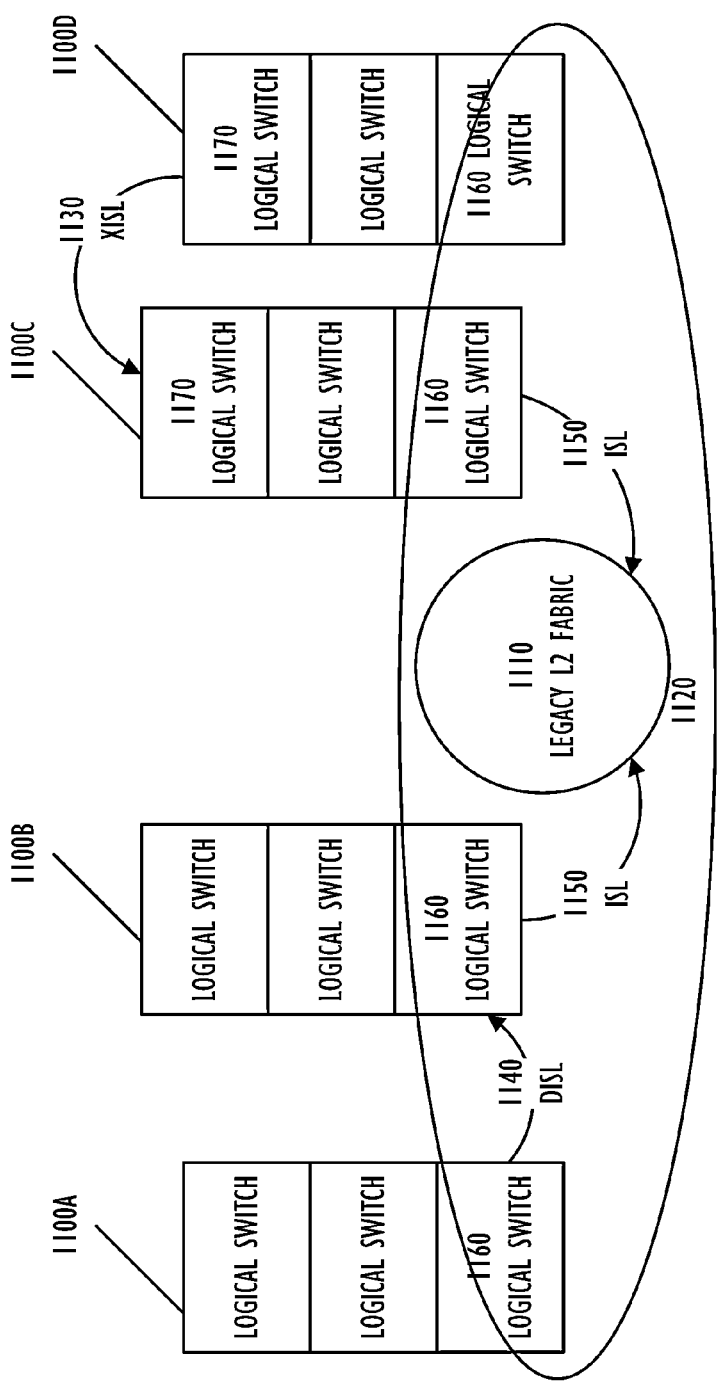
FIG. 11 is a block diagram illustrating a virtual fabric composed of multiple chassis and a legacy L2 fabric according to one embodiment.

FIG. 11 above illustrates an example of an expansion of a legacy L2 fabric using virtual fabrics. Legacy L2 fabric 1110 can be used to connect virtual fabric-capable chassis 1100, allowing the creation of a virtual fabric 1120 that includes legacy L2 fabric 1110. As before, new virtual fabric 1120 can include DISLs 1140 to connect some of the logical switches 1160 of the virtual fabric 1120, DISLs 1150 to connect with the legacy L2 fabric 1110, and XISLs 1130 to connect logical switches 1170, allowing creation of LISLs (not shown in FIG. 11) to connect logical switches 1160 in chassis 1100c and 1100d.

If a virtual fabric is created across long distance XISLs, then disruption of the XISL would result in a virtual fabric wide disruption. Even if precautions to minimize disruptions are taken, merging previously independent base fabrics across long distance links to create one large base fabric to share devices can pose several problems. One problem is related to potential fabric ID conflict. Since these previously independent base fabrics were configured independently, the same fabric IDs may have been used to create virtual fabrics. In such a case, fabric IDs must be reconfigured to resolve the conflict and such a configuration change can be disruptive in some embodiments. Another problem is related to disruption of routing within the base fabric during fabric merge. Since these previously independent base fabrics were brought up independently, the same domain IDs may have been assigned to the base logical switches. In such a case, domain IDs must be reconfigured to allow the merge and such operation can require disabling the affected base logical switches in some embodiments. Although these issues are typically one-time occurrences, potential disruptions can be severe.

In order to alleviate the problems, a hierarchical base fabric configuration can be used. A primary base fabric is used to create virtual fabrics and share devices among them within a locality, while a secondary base fabric is used to share devices across long distance. In other words, long distance XISLs are only present within secondary base fabric. Logical switches associated with the secondary base fabric are physically connected to virtual fabrics associated with primary base fabrics to provide device sharing. Such configuration can be achieved by having separate chassis to create two separate base fabrics. In some embodiments, both primary and secondary base fabrics can coexist within a single chassis. In such a configuration, logical switches are associated with either base fabric during creation.

Figure 12:
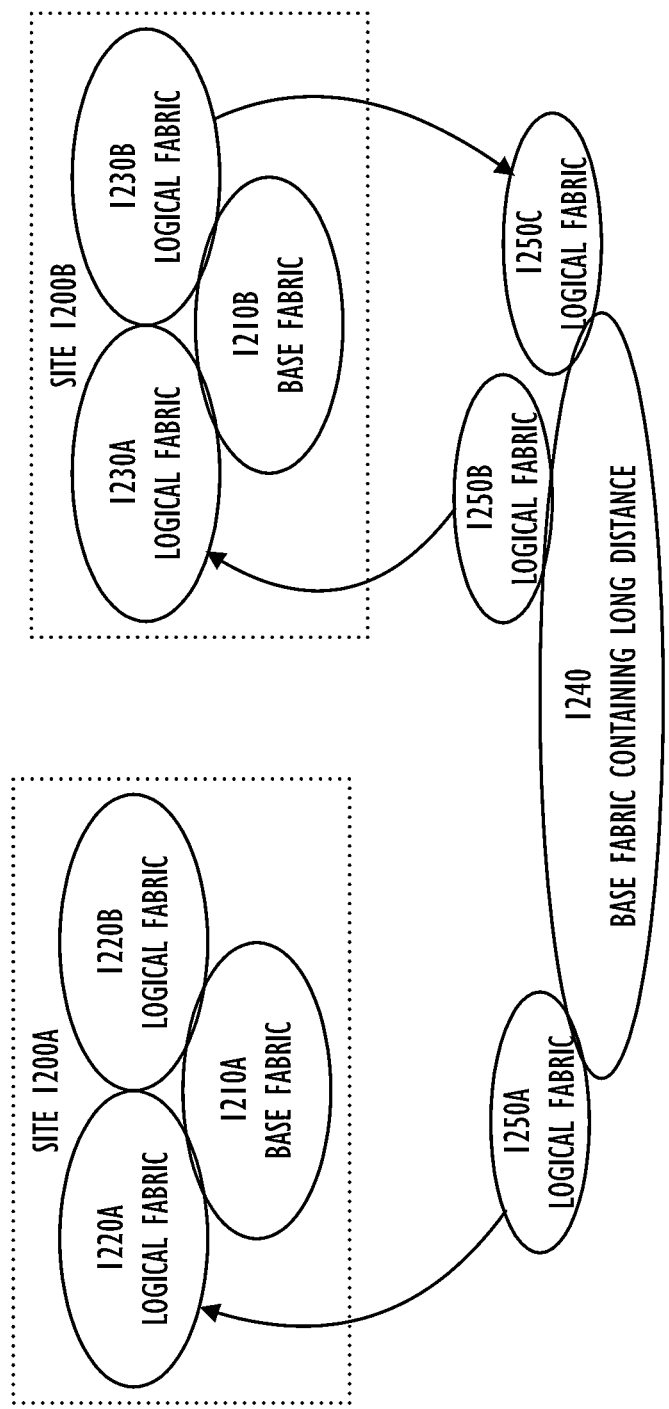
FIG. 12 is a block diagram illustrating an example of using a base fabric containing long distance to connect virtual fabrics.

FIG. 12 illustrates an example of a hierarchical base fabric topology. Instead of connecting base fabrics 1210 from site 1200a and site 1200b to create single base fabric across a long distance link between the sites, a separate base fabric 1240 is created and virtual fabrics 1250 associated with the new base fabric 1240 are used to physically link between the virtual fabrics 1220 and 1230. FIG. 12 is meant to portray a high-level fabric topology for such a hierarchical configuration, without detailing logical switches, etc. Such topology can be fulfilled using separate chassis for all three base fabrics or a chassis in each site can contain both the primary base fabrics and part of the secondary base fabric 1240. In such a hierarchical configuration, failure of the long distance link in the base fabric 1240 would disconnect sites 1200a and 1200b from each other, but the virtual fabrics in those sites 1200 would remain intact for local communication.

Figure 13:
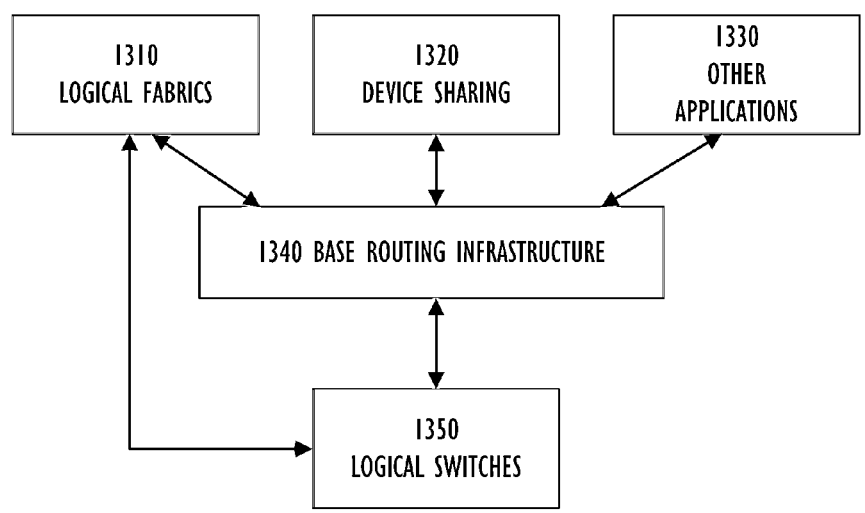
FIG. 13 is a block diagram illustrating a high-level architecture for partitioning a chassis according to one embodiment.

We now turn to a description of embodiments of an architecture that can provide virtual fabrics as described above. FIG. 13 provides a high-level overview of one embodiment of such architectures. Element 1310 provides support for virtual fabrics. Element 1320 provides support for FC device sharing. Element 1340 provides support for the base routing infrastructure of the switching apparatus. Element 1350 provides support for logical switches. In addition, element 1330 provides support for other switching applications. Together, these elements provide for partitioning the switching apparatus into logical or virtual fabrics such as have been disclosed above.

Figure 14:
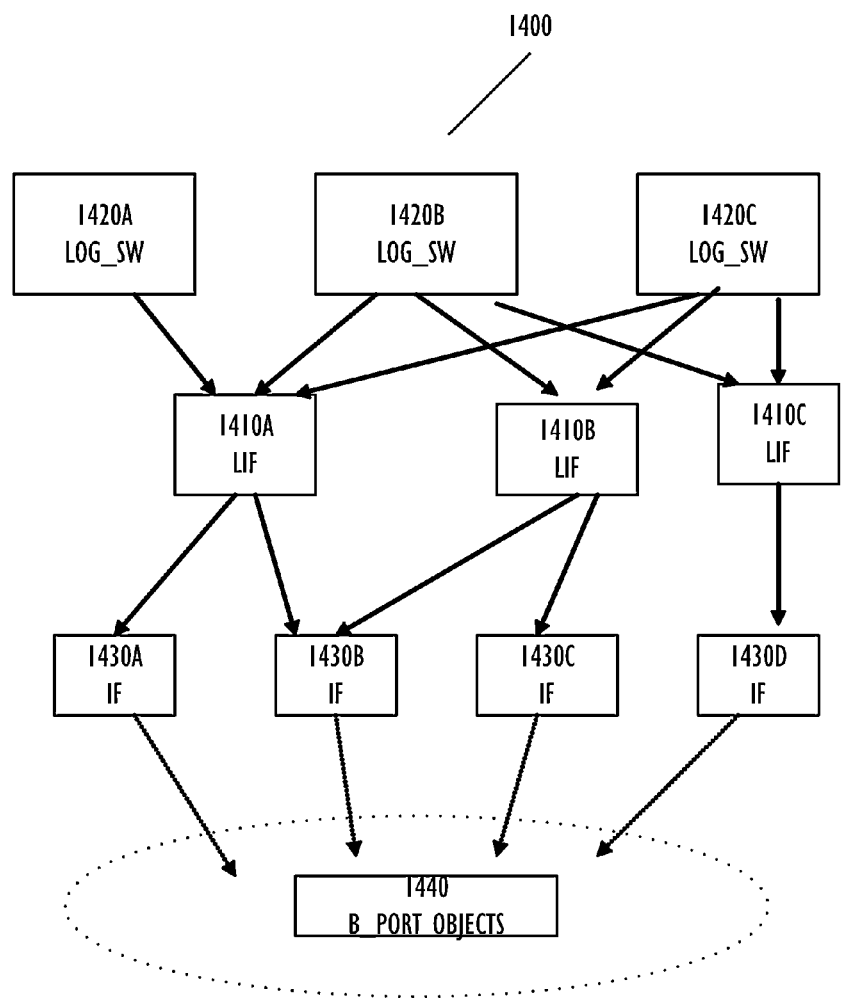
FIG. 14 is a block diagram illustrating a hierarchy of logical switches, logical interfaces, physical interfaces, and ports according to one embodiment.

FIG. 14 illustrates one embodiment of an interface hierarchy 1400 that allows for virtual fabrics. The interface hierarchy 1400 is a many to many relationship. A single interface is created for every reachable base fabric domain. A logical fabric manager (LFM) (discussed in more detail below) runs a logical topology algorithm to determine the LISLs to be created, based on user configuration selections. For every LISL created by the LFM to a domain b, the LFM creates a logical port in the switch and associates it with the logical interface (LIF) corresponding to the base fabric domain b. LFM also sends the list of interfaces corresponding to the XISLs to reach base fabric domain b and creates an association between the LIFs and the regular interfaces.

In FIG. 14, LIF 1410a corresponds to a first base fabric domain and LIF 1410b corresponds to a second base fabric. The LFM creates an LISL from logical switch 1420a to a logical switch 1420b on the first base fabric domain. To do this, the LFM creates a logical port on logical switch 1420a corresponding to this LISL and calls a function of the LIF 1410a that forms an association between the logical port and the LIF 1410a. Similarly, when the LFM creates an LISL between logical switch 1420b and logical switch 1420a, an association is formed between the corresponding logical port of logical switch 1420b and the LIF 1410a.

The LIF to IF mapping in FIG. 14 defines the XISLs that need to be used for tunneling the frames that traverse the LISLs. IFs 1430 connect to the physical ports 1440 associated with each IF 1430.

LIF 1410c in FIG. 14 corresponds to a logical F-port. For every F-port created in the chassis, an LIF is created, as well as an association between all logical F ports associated with that particular regular F port and the LIF 1410c. This LIF 1410c is in turn associated with the interface 1430 corresponding to the regular F-port, in FIG. 14, IF 1430d. The arrows between the logical switch 1420c and IF 1430d define this association.

Figure 15:
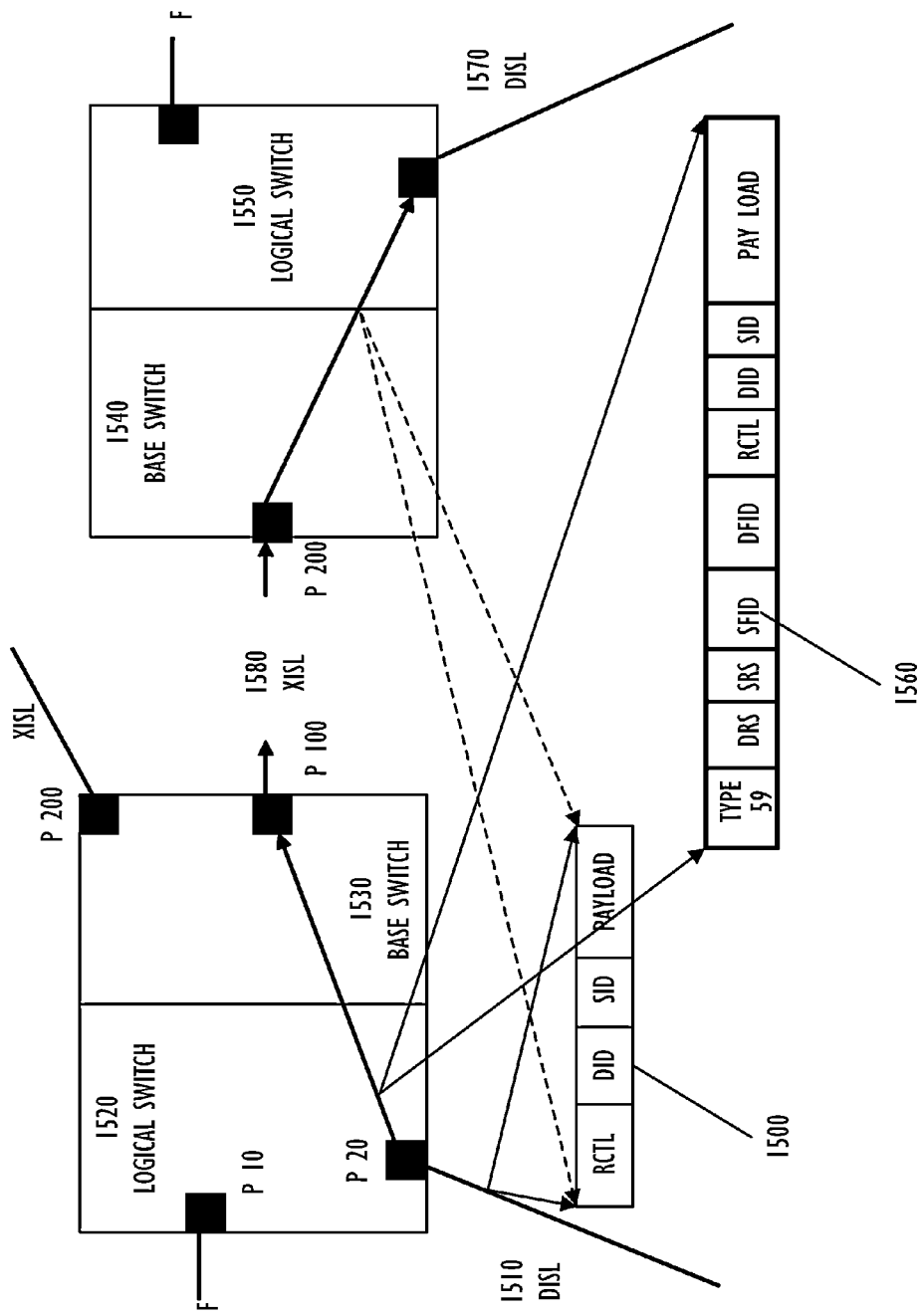
FIG. 15 is a block diagram illustrating frame encapsulation for transmission across a logical inter-switch link between two logical switches according to one embodiment.

FIG. 15 illustrates one embodiment of a frame flow when routing frames in a virtual fabric across an XISL 1580. When there are no XISLs, routing works just like in conventional L2 switches by properly configuring the routing tables in the physical ports. Each logical switch has its own view of the fabric, routes, etc. Each logical switch is managed as if it were a conventional L2 switch. When XISLs are part of a virtual fabric, then L3 routing is used to route frames across the virtual fabric. The base logical switch for a source chassis identifies the chassis and base logical switch yielding the shortest path to a destination switch in the virtual fabric. That shortest path is then used in the base fabric to get to the destination chassis. When using multiple chassis, multipathing can be available in some embodiments. Some embodiments can switch from L3 routing to port-based routing when running out of hardware resources.

In some embodiments, each virtual fabric uses a different virtual channel (VC) over the XISL 1580. In one embodiment, up to four virtual channels can be used. If available, Quality of Service (QoS) VCs are maintained across the base fabric.

When routing frames for a virtual fabric over XISLs, and both DISLs and LISLs are available paths, the routing algorithm in one embodiment gives preference to DISLs over LISL routing over XISLs if the paths through the DISLs and XISLs have an equal number of hops. In other embodiments, other preferences can be configured.

As shown in FIG. 15, a frame 1500 is sent over DISL 1510 to a physical port (P20) associated with logical switch 1520, with destination information indicating that the frame should be delivered over DISL 1570 associated with logical switch 1550. The frame is encapsulated by the logical switch for routing over the XISL 1580 at physical port P100, as shown by encapsulated frame 1560 that is formed according to the Fibre Channel Inter-Fabric Routing (FC-IFR) working draft standard. When the frame is received by the base logical switch 1540 at physical port P200 after traversing the XISL 1580, the frame is decapsulated back to frame 1500, which can then be delivered by logical switch 1550 over DISL 1570.

Figure 16:
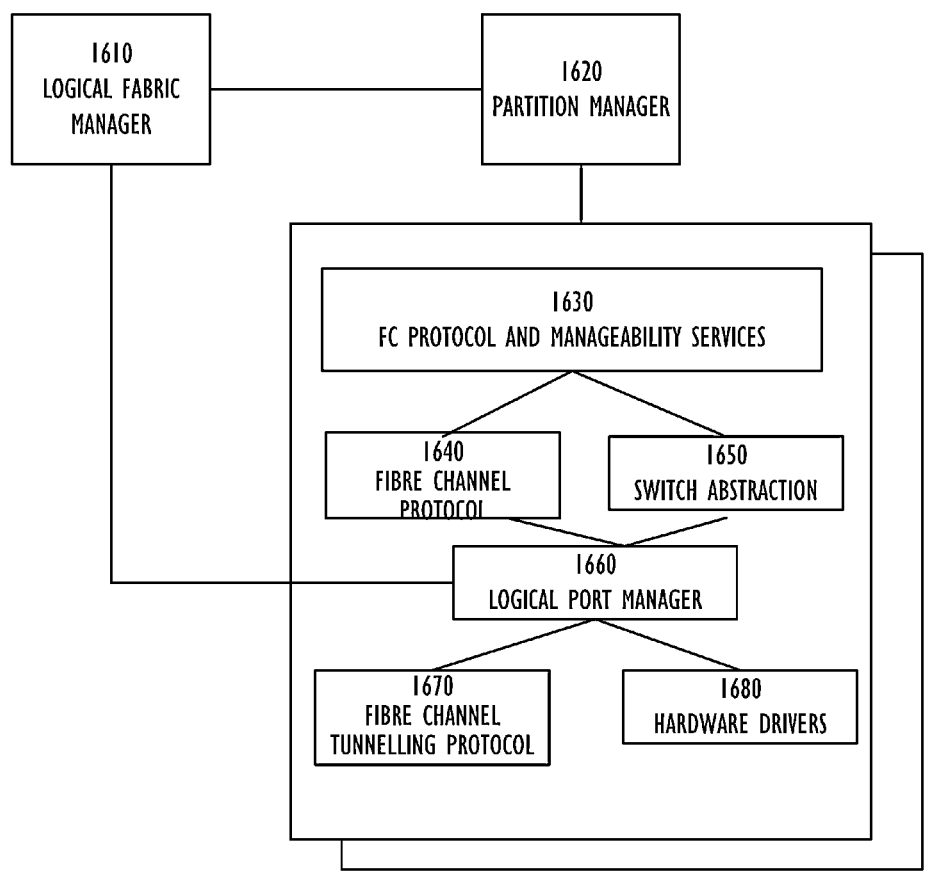
FIG. 16 is a block diagram illustrating a high-level software architecture for partitioning a chassis into virtual fabrics according to one embodiment.
Figure 17:
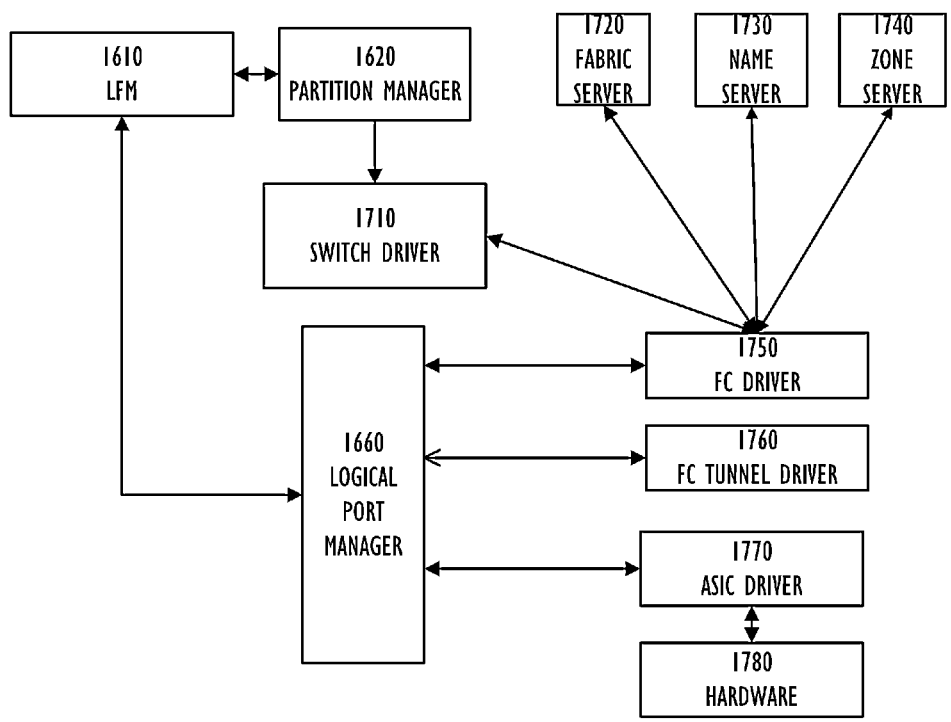
FIG. 17 is a block diagram illustrating one embodiment of control path layering for partitioning a chassis into virtual fabrics according to the embodiment of FIG. 16.
Figure 18:
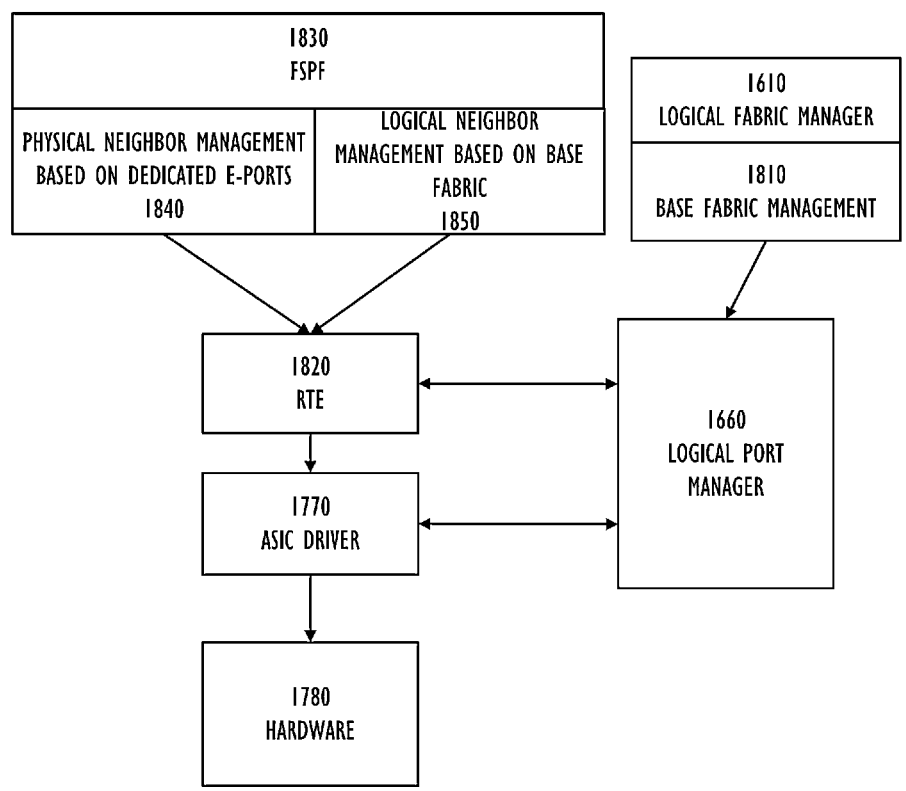
FIG. 18 is a block diagram illustrating one embodiment of data path layering for partitioning a chassis into virtual fabrics according to the embodiment of FIG. 16.

FIGS. 16-18 illustrate three different views of software layering for virtual fabrics according to one embodiment. FIG. 16 is a high-level stack view, FIG. 17 is a control path layering view, and FIG. 18 is a data path layering view.

FIG. 16 is a block diagram that illustrates high-level software architecture stack for partitioning a chassis into virtual fabrics according to one embodiment. Logical fabric manager (LFM) 1610 is responsible for creating and maintaining a virtual fabric topology for each virtual fabric of the chassis. The Partition Manager 1620 provides configuration about each partition in the chassis to the LFM 1610, sending the LFM 1610 information about the partitions configured in the local chassis, and for each partition, configuration information, such as the fabric id associated with the partition and other relevant information. LFM 1610 also interacts with the base fabric's fabric shortest path first (FSPF) module 1830 (best illustrated in FIG. 18) to know about domains in the base fabric and the base fabric topology. Configuration information is then exchanged with all other LF capable chassis in the base fabric. All partitions configured with the same fabric id would belong to the same virtual fabric. Based on the configuration information and base fabric topology, the LFM 1610 creates LISLs for each virtual fabric to establish the control path topology. In addition, the LFM 1610 coordinates with the virtual fabric FSPF module 1830 to establish a full mesh of phantom ISLs (PISLs) between logical switches for data paths.

The functionality of the LFM 1610 can be considered as follows: (a) maintaining a database of configuration information about each chassis in the base fabric such as the partition id and the fabric id for all the partitions in the chassis, chassis' switch capabilities etc.; (b) creating and deleting LISLs for control paths with a selected set of logical switches as determined by a logical adjacency determination algorithm; and (c) co-coordinating with the FSPF 1830 to facilitate a full mesh of destination router switch (DRS)-based connectivity PISLs for data paths between all logical partitions.

In addition to the Logical Fabric Manager 1610 and the Partition Manager 1620, which have a single instance for an entire chassis, the software architecture illustrated in FIG. 16 includes modules that have separate instances for each logical switch into which the chassis is partitioned. The per-switch instances includes a Fibre Channel Protocol and Manageability Services module 1630, which generally controls the software resources related to the Fibre Channel hardware for the partition created by the Partition Manager 1620. A Fibre Channel Protocol module 1640 provides services to the FC Protocol and Manageability Services module 1630 that relate to the Fibre Channel protocol. A Switch Abstraction module 1650 provides services related to abstraction of the logical switch from the physical hardware, using a Logical Port Manager (LPM) 1660 to manage the ports that are associated with the logical switch. The LPM 1660 also interacts with the Logical Fabric Manager 1610. The Logical Port Manager 1660 uses the services of a Fibre Channel Tunneling Protocol module 1670 for handling FC over FC encapsulation and decapsulation of traffic across LISLs defined for the logical switch. The Logical Port Manager 1660 uses the hardware drivers 1680 to manage the physical ports that are associated with the logical switch.

Irrespective of the topology of the virtual fabric, a logical switch according to various embodiments can send a data frame directly to another logical switch in the virtual fabric by encapsulating the frame in an inter-fabric routing (IFR) header and sending it over the base fabric to the destination switch's base fabric domain (DRS), as shown above in FIG. 15. To take advantage of this fact, the data path for the virtual fabric is preferably a full mesh between logical switches. In addition, the FSPF 1830 in L2 switches in the edge fabric might misroute the frames through less optimal paths unless their logical switch database (LSDB) reflects a full mesh of links between logical switches. Unless the logical topology that LFM 1610 creates for control paths is full mesh, in some embodiments the LISLs cannot be used for a data path, because the underlying hardware cannot route frames from one LISL to another LISL, which amounts to removing the IFR header and adding a new IFR header to the same frame.

In some embodiments, the data path is decoupled from the control path. Irrespective of the set of LISLs that the LFM 1610 creates for a virtual fabric, the LSDB of the virtual fabric's FSPF 1830 preferably reflects a full mesh of PISLs between all the logical switches. The cost of these links is the cost of the corresponding paths in the base fabric. For example, if domain A is connected to domain B in the base fabric by two hops, the link cost of each being 0.5, the data path link cost of A and B in the virtual fabric is 1.0.

The base fabric FSPF 1830 provides a distance metric for each base fabric domain from the local chassis. Calculating and programming routes with the PISLs directly results in ASICs being programmed to encapsulate the frame at a logical switch port using the DRS and also to route at a base fabric port based on the FID/DID of the encapsulated frame.

The LPM 1660, as the name suggests, manages all logical ports in the chassis for a logical switch. The LFM 1610 creates a logical port with LPM 1660 for each LISL that it creates. Other embodiments can have other kinds of logical ports and the LPM 1660 in some embodiments is designed to handle different logical ports supporting different protocols (e.g., FC over FC, FC over IP, VSAN F ports etc).

In a different view, FIG. 17 illustrates a control path layering according to one embodiment. The LFM 1610 interacts with the Partition Manager 1620 and the LPM 1660 for each logical switch. The Partition Manager 1620 interacts with instances of the modules for each logical switch through a Switch Driver 1710. The Switch Driver 1710 controls the logical switch through interaction with a Fibre Channel driver 1750. The Fibre Channel driver 1750 uses the services of a fabric server 1720, a name server 1730, and a zone server 1740 that provide services related to Fibre Channel fabrics, names, and zones to the entire chassis. The LPM 1660 instance for the logical switch gains access to those services through the FC Driver 1750. The LPM 1660 interacts with a Fibre Channel Tunnel Driver 1760 to control LISLs tunneling across XISLs, and the ASIC driver 1770 to control traffic across physical ports assigned to the logical switch, such as for a DISL. The ASIC Driver 1770 in turn drives the ASIC hardware 1780 to control the physical ports assigned to the logical switch.

The LPM 1660 maintains (a) a list of logical ports in the system and corresponding LIF objects, (b) attributes and properties associated with each logical port and (c) association between the logical ports and other physical ports. Association is many-to-many and in one embodiment is strictly hierarchical (a parent-child relationship). For example, in one embodiment, a VSAN F port is a parent of the underlying blade port in the chassis. Any frame that needs to be transmitted on the VSAN F port needs to be transmitted on the underlying blade port. A FC over FC (tunnel) logical port that is created for a LISL is a parent containing as its children the set of physical ports that belong to the base logical switch and that can be used to reach the DRS that is at the other end of the LISL. A frame that arrives on a particular port can be meant for any of its parents.

The LPM 1660 maintains callbacks for different protocols and provides de-multiplexing of control flow for frame transmit and receive based on the specified protocol.

The FC tunnel driver 1760 understands the FC over FC tunneling protocol and performs the encapsulation and de-encapsulation necessary for a virtual fabric frame to be tunneled in the base fabric. The tunnel driver 1760 registers with LPM 1660 handler functions for transmit and receive requests for the FC over FC protocol.

When a frame needs to be sent on a logical port or a LIF, an ops handler for the LIF object calls the tunnel driver 1760 (via the LPM 1660 infrastructure) to add the IFR header, providing it with the DRS, Source Fabric Identifier (SFID) and Destination Fabric Identifier (DFID) to use. The tunnel driver 1760 returns the encapsulated frame, which is then transmitted on one of the physical ports that is a child of the LIF object.

When a tunneled frame is received on a logical port, the ASIC driver 1770 calls the tunnel driver 1760 (via the LPM 1660 infrastructure) to handle the frame. The tunnel driver 1760 infers the fabric id and base fabric source domain from the frame header. The tunnel driver 1760 is then able to identify uniquely one of the parent logical ports as a recipient of the frame, based on the header information. The tunnel driver 1760 then delivers the frame to the logical port by calling the receive function for the LIF object.

The ASIC driver 1770 manages the ASIC resources of the chassis and is responsible for populating the appropriate registers and tables of the hardware 1780 based on various kinds of information provided by other kernel modules, particularly the fabric operating system routing module.

For example, based on the information provided, the ASIC driver 1770 programs the routing information in the routing tables used by the hardware 1780 for the physical ports.

The switch driver 1710 supports logical ports, including supporting the creation and deletion of logical ports, IOCtls on logical ports, and interacting with the LPM 1660 and LIF objects as needed. Ops function for the LIF objects are provided by the switch driver 1710.

In some embodiments, the switch driver 1710 also sends domain controller frames through PISLs (even though there is no port associated with a PISL) and other supporting other virtual fabric and routing related IOCtls.

Although the previous description is written in the context of software, as is described below, the encapsulation of frames described above may be performed by hardware in the ASIC instead of the various drivers described above. In one embodiment, firmware drivers may perform these actions for control path frames originating in the CPU of the switch, while the hardware performs these actions for datapath frames, performing encapsulation and decapsulation in addition to L3 routing.

A third view, related to data path layering, is presented by FIG. 18. Data from the LFM 1610 flows through the base fabric management portion 1810 of the LFM 1610 to the LPM 1660. The LPM 1660 provides port information to a RouTing Engine (RTE) 1820, which also receives data from FSPF module 1830, either from physical neighbor management based on dedicated E_ports (1840) or logical neighbor management based on the base fabric configuration (1850).

The RTE 1820 performs routing table development. In addition, the RTE 1820 uses reachability information received from the FSPF 1830 to create an edge structure or calculate a path. The RTE 1820 passes DRS interfaces to the ASIC driver 1770, which then uses the DRS associated with the interface.

The RTE 1820 in some embodiments includes DRS interfaces and hierarchical routing. In such embodiments, the RTE 1820 treats a DRS like a regular FC interface in terms of accepting reachability information from the FSPF 1830, creating an edge structure or calculating a path. When programming the routes, the RTE 1820 passes the DRS interface to the ASIC driver 1770, which uses the DRS associated with the interface to interact with the hardware 1780.

Hierarchical routing is a feature of one embodiment of the RTE 1820 that maintains sources and destinations at different levels of the hierarchy, such as ports in a chassis, logical sources and destinations connected to the chassis, and LF destinations connected to the fabric, and understands the relationship between entities at different levels. For example, a DRS interface corresponds to a domain in a base fabric and an egress interface corresponds to a port in a chassis. This results in improved load balancing considering the load at the lowest level of hierarchy while calculating routes at a higher level.

The ASIC driver 1770 uses the data received from the RTE 1820 and other information about the physical and logical ports associated with the logical switch received from the LPM 1660 to program the hardware 1780.

Figure 19:
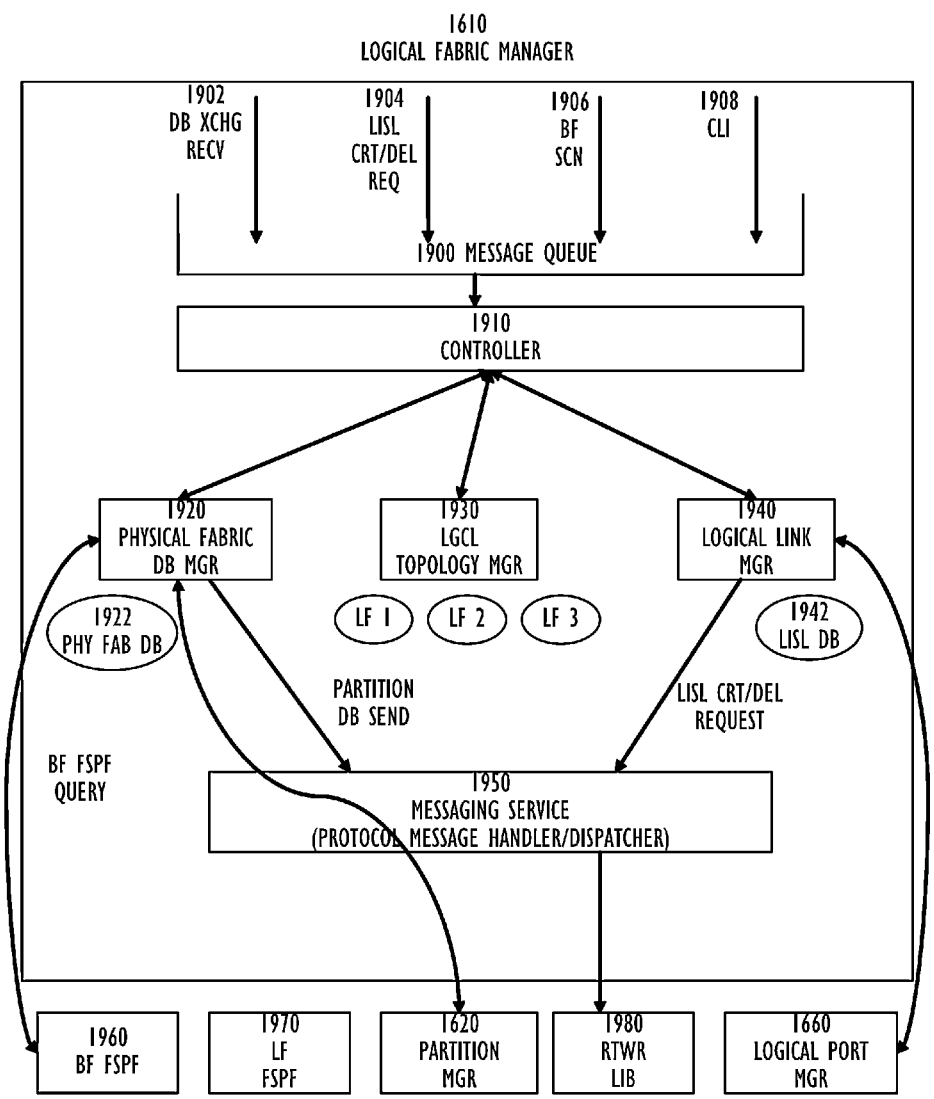
FIG. 19 is a block diagram illustrating one embodiment of a logical fabric manager according to one embodiment.

In one embodiment, as illustrated in FIG. 19, the LFM 1610 runs as a single threaded user level daemon servicing events one at a time from a common message queue 1900. The LFM 1610 includes a controller block 1910 that is responsible for handling all incoming events, such as (1) a DB exchange received event (1902); (2) a LISL create/delete request from a LFM in another chassis (1904); (3) a state change notice (SCN) indicating a change in the base fabric, such as when a domain becomes reachable or unreachable (1906); and (4) IOCtls to handle command line interfaces (CLIs) (1908). The controller block 1910 services each event by coordinating with other blocks within the LFM 1610.

The LFM 1610 also includes a physical fabric database manager 1920, which in some embodiments maintains a physical fabric database 1922 containing information about the base fabric topology and information about each chassis in the multi-chassis base fabric such as configuration, capabilities used, etc. Also maintained is a distance metric for each chassis in the base fabric, based on base fabric topology, to be used by a logical adjacency determination algorithm.

The LFM 1610 also includes a logical topology manager 1930, that determines the list of logical ISLs that the logical switch should establish with other logical switches in the fabric using a logical adjacency determination algorithm and is responsible for maintaining the list of LISLs that have been created for each virtual fabric.

The LFM 1610 also includes a logical link manager 1940, which is responsible for establishing and tearing down logical ISLs with other switches using a LISL creation/deletion protocol and interacting with the logical port manager 1660 to create/delete corresponding logical ports. In one embodiment, the logical link manager 1940 employs a LISL database 1942 for this purpose.

In one embodiment, the physical fabric DB manager 1920, the logical topology manager 1930, and the logical link manager 1940 use a messaging service 1950 to handle messaging between them, the partition manager 1620, and a reliable transmit with response (RTWR) module 1980.

In some embodiments, the LFM 1610 can be implemented as a state machine, as will be understood by one of ordinary skill in the art. Whenever a state machine is uninstantiated because of a remote partition being removed or remote base fabric domain becoming unreachable, the corresponding logical port is uninstantiated and any pending request messages for the LISL with RTWR are cleaned. The logical ports that are created when an LISL is established are registered with the switch driver 1710 as part of the logical switch. A logical port goes into an online state when the creation protocol completes and becomes available for regular control path activities.

The following is a sequence of events that happen when a new partition is created in the local chassis according to one embodiment. The partition manager 1620 begins by creating a new partition with the kernel and allocating appropriate resources. After the partition is created, the partition manager 1620 notifies the LFM 1610 of the new partition along with attributes of the new partition, in particular a partition ID and fabric ID. The LFM 1610 updates its physical fabric database 1922 with the new partition's information and sends an asynchronous configuration update to all virtual fabric-capable chassis in the base fabric. The LFM 1610 runs a logical adjacency determination algorithm for the new partition to identify the set of LISLs to create. The LFM 1610 creates a logical port in the new partition for each LISL that is created, by sending a logical port creation request to the LPM 1660 and specifies the set of physical ports in the base fabric that can be used to reach the peer domain as its children. The LPM 1660 allocates an LIF object in the logical port hierarchy and adds the specified children. It also registers the logical interface id with an interface manager as a DRS type interface. The LPM 1660 allocates a user port number and port index within the partition for the logical port. It then sends a port creation request to the switch driver 1710 for the partition, specifying the logical interface ID.

The LFM 1610 runs a LISL creation protocol with the peer switch. In one embodiment, the LISL creation protocol is a two-way handshake between the requesting LFM 1610 and responding LFMs. The requesting LFM 1610 sends a message containing the FC worldwide name (WWN) of the requesting chassis, a base domain identifier, a virtual fabric ID, the WWN of the logical switch connected to the LISL, and the user port number in the logical switch. Responding LFMs send a message to the requesting LFM 1610 containing the responding chassis's WWN, a base fabric domain identifier, and a user port number. The disclosed protocol is illustrative only and other creation protocols and message contents can be used. The LFM 1610 maintains a database 1942 of LISLs that it has established with other logical switches (as either a requestor or responder) and stores attributes of the LISL in this database 1942. In some embodiments, the LISL database 1942 also contains information for LISLs that are in the process of being established.

In one embodiment, a state machine, illustrated in FIG. 30, is used for each LISL that the LFM 1610 attempts to establish and implements a LISL protocol with peer switches for creating and deleting LISLs. The state is maintained as part of the database of LISLs 1942. The technique used can attempt to establish an LISL with a logical switch that is not yet online. In that event, the state machine and the logical port exist, but the state of the LISL is set to indicate that the peer partition is down. When the peer LFM notifies the LFM 1610 that the peer logical switch is up, then the LFM 1610 can set the LISL as online.

As illustrated in FIG. 30, from a start state 3005, if a LISL creation request is received, the state machine transits to state 3030, indicating a request has been received. If the request is accepted, the state machine transits to state 3040, where the logical port is created, then to state 3065, indicating the logical port is online. If the request is rejected, then the rejection response is sent, and the state machine moves to state 3070, indicating the LISL creation request has been rejected.

If at start state 3005 a LISL creation is to be initiated, then the state machine transits to state 3010, where the logical port is created, then a creation request is sent to the peer LFM, moving the state machine to state 3030, which indicates the creation request has been sent. If the LFM 1610 receives a message indicating the request should be retried, then the state machine transits to state 3015, at which point the request is resent, transiting the state machine back to state 3030. If, as discussed above, the LFM 1610 receives a response indicating the peer partition is down, then the state machine moves to state 3035, where it waits until receiving a peer switch online notification, at which point the state machine moves back to state 3030, to retry the request.

If the response received indicates that the peer LFM in creating the other end of the LISL, then the state machine moves from state 3030 to state 3025, indicating that a peer request is in progress. Upon receiving a creation request from the peer LFM, the state machine moves to state 3045, indicating the LFM 1610 has received the request, and from then to state 3075 as the LFM sets the logical port online. If, while in state 3030 the LFM 1610 receives a LISL creation request, the state machine transits to state 3045, proceeding further as described above.

If the LFM 1610 receives an accepted response to the LISL creation request, then the state machine moves to state 3050, indicating the request has been accepted, and then the LFM 1610 sets the logical port online and moves to state 3075.

If the LFM 1610 gets an error response indicating that the LISL creation request timed out, then the state machine moves to state 3060, indicating the creation request failed. The LFM then retries the request with an increased timeout, moving back to state 3030.

If while in state 3075 the LFM 1610 determines the peer partition is down, then the LFM 1610 sets the logical port down or offline and moves to state 3035, to wait until the peer switch comes online.

At the completion of the protocol, the LFM 1610 moves the logical port to online state. The switch driver 1710 sends a port up state change notice (SCN) to all relevant protocol daemons. The FSPF 1830 ignores this event because the port corresponds to an LISL. Other daemons act on the port like a regular port. Thus, a virtual fabric is formed.

The LFM 1610 waits for a fabric formed event for the virtual fabric, and upon receipt of the event notification, sends a data path up SCN to the virtual fabric FSPF 1830 (for the new partition) for each base fabric domain that has a partition in the same fabric. The SCN contains the LIF that was allocated for the base fabric domain. The cost of the link is specified in the SCN and is set to the cost of the corresponding path in the base fabric, as discussed above.

The virtual fabric FSPF 1830 floods logical switch database (LSDB) 1942 updates on all dedicated ISLs. The new link in the FSPF 1830 triggers a path calculation. The FSPF 1830 sends path information messages for all affected paths to the RTE 1820 (via the switch driver 1710 for the partition). The paths may contain LIFs in the reachable interfaces list.

The RTE 1820 creates a DRS edge for each LIF specified in the reachability list for a destination. The RTE 1820 sends add route IOCtls to the ASIC driver 1770 for each new route that is created or affected.

The ASIC driver 1770, when receiving an add route IOCtl, acts based on the destination fabric id, base fabric id and egress interface type. If the destination fabric id is the same as the base fabric id, the egress type is expected to be logical (containing logical interfaces) and the L2 tables are programmed accordingly. If the destination fabric id is different, the L3 routing entry is programmed. If the egress interface type is DRS, the DRS attribute of the interfaces will be used in the encapsulation header. If egress interface is logical, the egress interface is specified in the L3 routing entry directly. In either case, a flag in the IOCtl specifies whether an encapsulation header should be added. When an egress interface id is specified, the DRS of the local chassis is used.

The virtual fabric FSPF 1830 updates the switch driver 1710 with the new set of interfaces available to send domain controller frames for each affected remote virtual fabric domain.

The switch driver 1710 updates the domain-port table. If the specified interface is a data path LIF, the switch driver 1710 directly stores the LIF instead of the port number in the table and sets a flag saying the entry corresponds to an LIF directly.

When a partition is to be deleted, the partition manager 1620 makes a synchronous call to the LFM 1610 to notify the LFM 1610 of the partition to be deleted. The LFM 1610 removes the partition from its physical fabric database 1922 and sends an asynchronous configuration update to all virtual fabric-capable chassis in the base fabric. The LFM 1610 sends a data path down SCN for each data path link to the virtual fabric FSPF 1830 for the partition. The virtual fabric FSPF 1830 removes the corresponding LSRs, and sends LSDB 1942 updates on all dedicated ISLs. The virtual fabric FSPF 1830 will also update the switch driver 1710 with the new set of interfaces available to send domain controller frames for each remote virtual fabric domain (the new set might be empty).

The LFM 1610 runs a LISL teardown protocol for each LISL in the partition and deletes the logical ports associated with the LISL by sending a port delete request to the LPM 1660. The LPM 1660 sends a synchronous port deletion request to the switch driver 1710. The switch driver 1710 sends a port down SCN for the logical port to all relevant protocol daemons. The FSPF 1830 ignores this event because the port corresponds to an LISL. The switch driver 1710 finally removes the logical port.

The LPM 1660 destroys the LIF object, unregisters the LID id with the interface database, and notifies the LFM 1610 when the cleanup is complete. The LFM 1610 returns to the partition manager 1620. The partition manager 1620 deletes the partition with the kernel, completing the deletion process.

Figure 20:
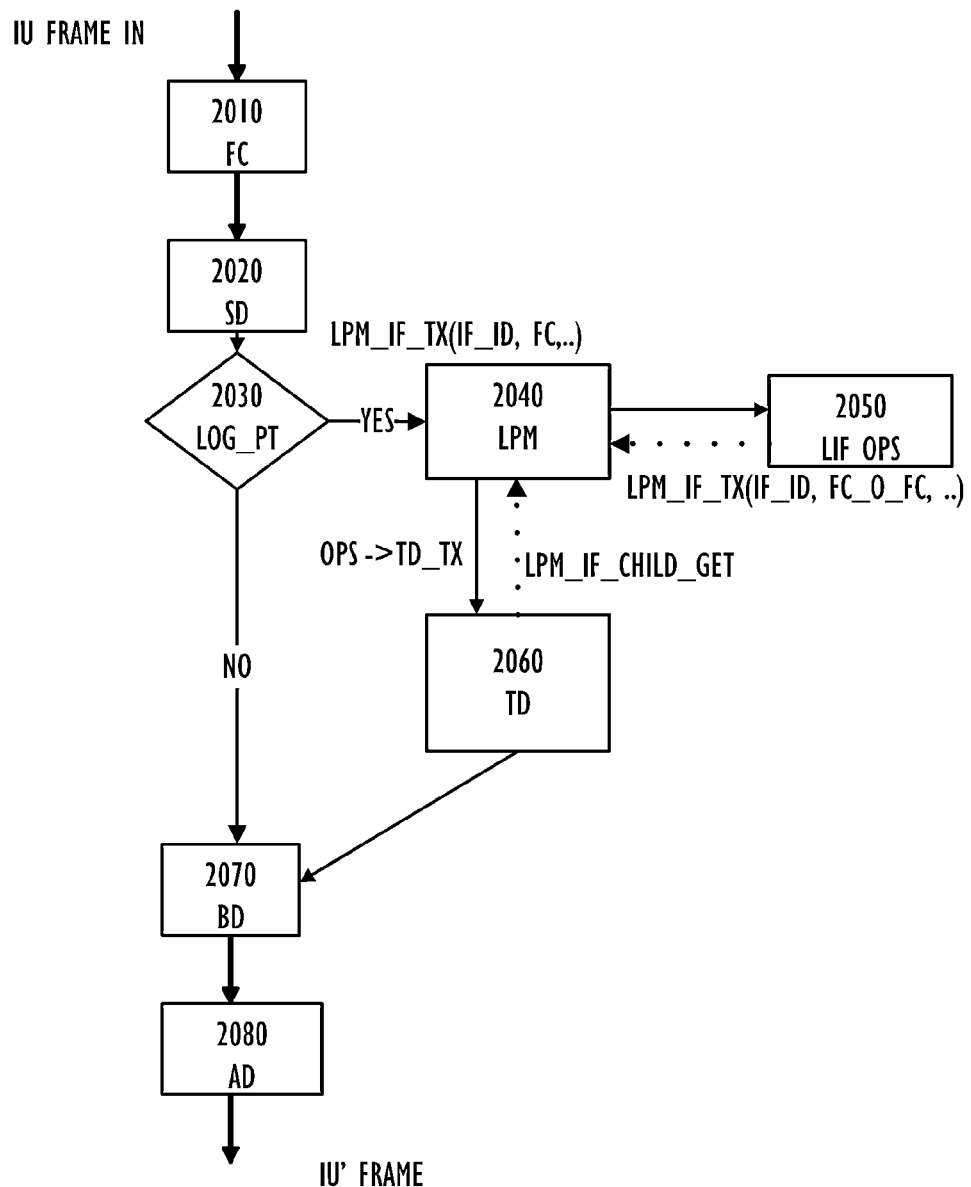
FIG. 20 is a flowchart illustrating one embodiment of a transmit flow path for a frame received on a logical port.
Figure 21:
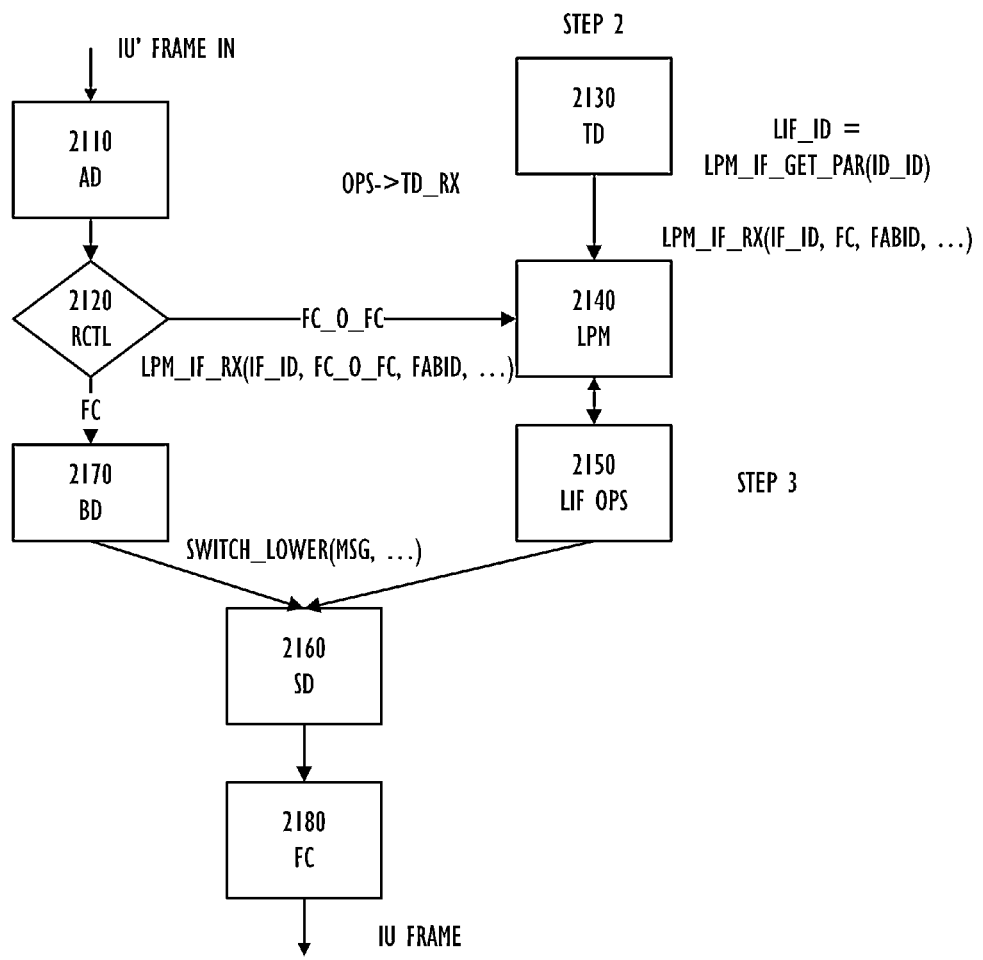
FIG. 21 is a flowchart illustrating one embodiment of a receive path for a frame received on a logical port.

FIGS. 20-21 illustrate frame transmit and receive paths and control paths according to one embodiment, as frames pass through a system configured for virtual fabrics. Frames are passed in Information Units (IUs) data structures that are received or sent by the FC protocol layer 1640. FIG. 20 illustrates a frame transmit path when a frame is received on a logical port and the way the LPM 1660 gets involved in the flow path. A frame received on a regular port takes a conventional path through the switch, but a frame received on a logical port is tunneled through XISLs in the base logical switch. When daemons need to send a frame, they send a command to the FC Driver 1750. The frame is received by the FC driver 1750 in block 2010, and is then sent through the Switch driver 1710 in block 2020.

The Switch driver 1710 then determines in block 2030 whether the frame was received on a logical port. If so, then the switch driver 1710 invokes the LPM 1660 in block 2040, indicating the frame was received as a FC frame. The LPM 1660 invokes an LIF OPS element in block 2050, which finds a physical port of the LIF on which to transmit the frame, passing that information back to the LPM 1660. The LPM 1660 invokes the tunnel driver 1760 in block 2060 to encapsulate the frame. The tunnel driver 1760 invokes a blade driver in block 2070 to transmit the frame, which passes the frame to the ASIC driver 1770 in block 2080 for transmission. If the frame was received on a regular port, then the frame is passed to the blade driver from the switch driver 1710 without invoking the LPM 1660.

Although the previous description is written in the context of software, as is described below, the encapsulation of frames described above may be performed by hardware in the ASIC instead of the various drivers described above. In one embodiment, firmware drivers may perform these actions for control path frames originating in the CPU of the switch, while the hardware performs these actions for datapath frames, performing encapsulation and decapsulation in addition to L3 routing.

FIG. 21 illustrates a frame receive path in a similar embodiment. When a frame is received by the ASIC driver 1770 in block 2110, the ASIC driver 1770 checks the R_CTL field of the IU header in block 2120. If the R_CTL field indicates an FC over FC frame, indicating a tunneled frame, the frame is sent to the tunnel driver 1760 in block 2130 by invoking the LPM 1660 in block 2140. The LPM 1660 then invokes the LIP OPS element in block 2150 to invoke the switch driver 1710 in block 2160. At that point, the frame is processed as if it were received on a physical port, passing the frame through the Fibre Channel driver 1750 in block 2180. If frame is not FC over FC, indicating it does not involve a logical port, the ASIC driver 1770 invokes the blade driver in block 2170, which then invokes the switch driver 1710 in block 2160 for normal processing of the frame through the Fibre Channel driver in block 2180 as in conventional switches.

Turning to FIG. 22, a flowchart illustrates one embodiment of a technique for encapsulating a frame that passes across a LISL. In block 2210, the size of the frame is validity checked. If valid, then in block 2220, the FID is determined by querying the LIF, and validity checked in block 2225. If valid, the transmit domain is determined by querying the LIF, and validity checked in block 2235. If any of the validity checks of blocks 2210, 2225, or 2235 fail, an error is returned in block 2215.

Then in block 2240, the source domain is obtained by querying the LIF. A new frame is allocated in block 2245 big enough to hold the original frame and the encapsulation header and the IFR header. In block 2250 the encapsulation header is created in the new frame, then in block 2260, the header and data of the original frame are copied to the new frame. The memory holding the original header is then freed in block 2265 and a pointer to the new frame is set in block 2270. In block 2275, a logical interface is obtained for the exit port, and the process is completed by invoking the LPM 1660 to transmit the encapsulated frame over the logical interface.

Figure 23:
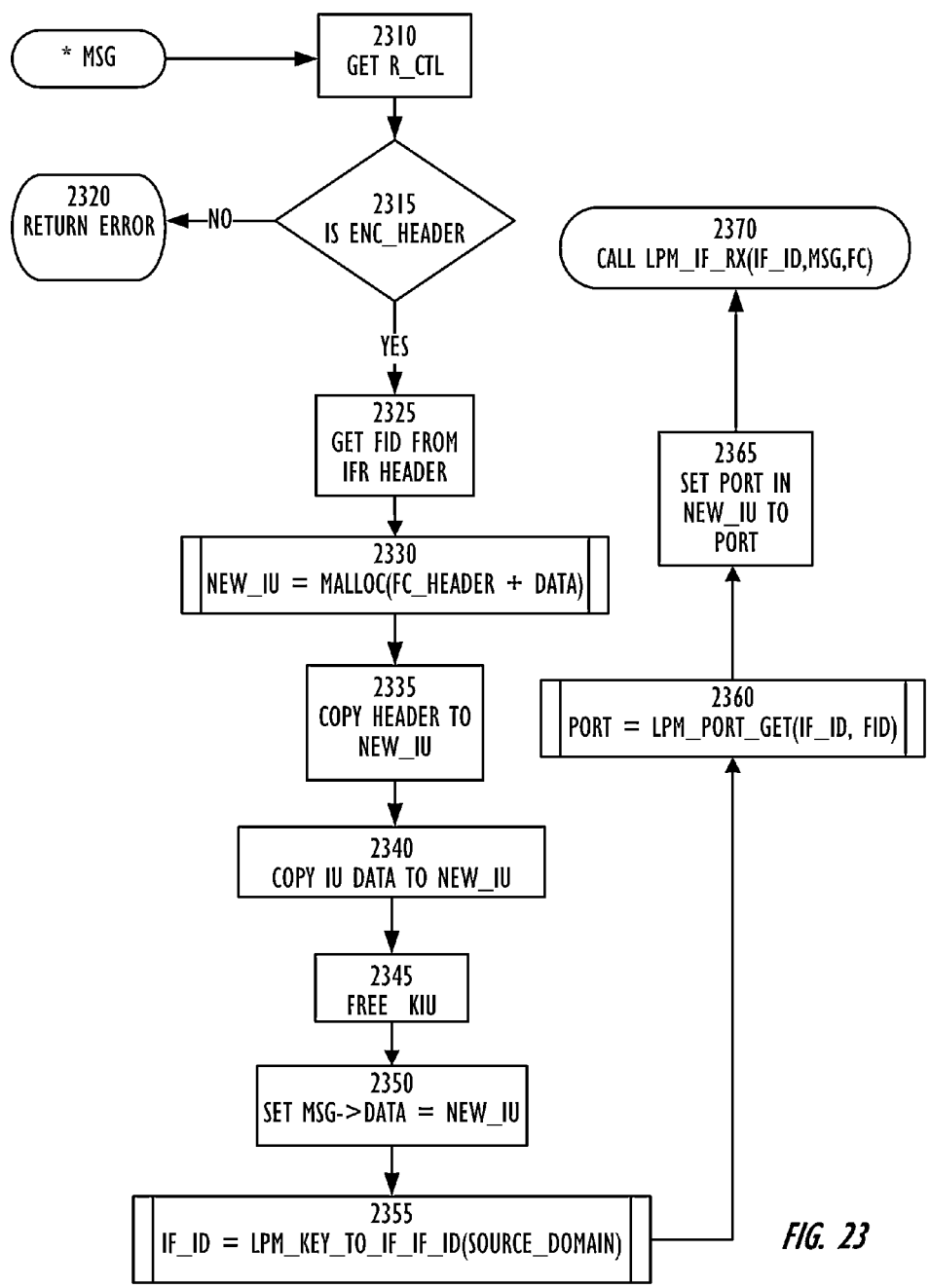
FIG. 23 is a flowchart illustrating one embodiment of a technique for decapsulating a frame traveling across an LISL.

FIG. 23 illustrates an embodiment of a similar technique for decapsulating a frame passing across an LISL. In block 2310, the RCTL field of the frame is obtained, and then in block 2315 it is validity checked by checking to see if the header is an encapsulated header. If not, then in block 2320 an error is indicated. If the header is valid, then in block 2325 the FID is obtained from the IFR header. In block 2330, a new frame is allocated big enough to hold the decapsulated frame. The header is copied to the new frame in block 2335, and the payload data in block 2340. The memory holding the encapsulated frame is freed in block 2345 and a pointer is set to the new decapsulated frame in block 2350. In block 2355, the LPM 1660 is invoked to determine the interface id associated with the new frame, and then in block 2360, the LPM 1660 is invoked to determine the port to be associated with the new frame, based on the interface id and the FID. The port value is stored in the decapsulated frame in block 2365 and the LPM 1660 is then invoked in block 2370 to handle the decapsulated frame.

As discussed previously, the protocol for transmitting virtual fabric frames over the base fabric involves adding two extended headers to each data frame that is transmitted over a LISL: an inter fabric routing extended header (IFR_header), and the encapsulation extended header (Enc_header). The inter-fabric routing extended header (IFR_header) provides the necessary information to support fabric-to-fabric routing. The information includes: (a) the fabric identifier of the destination fabric (DF_ID); (b) the fabric identifier of the source fabric (SF_ID); and (c) information appropriate to determine the expiration time or hop count. The encapsulation extended header is used to transmit frames between Inter-fabric Routers in a multi-chassis virtual fabric.

In the case where a data frame is transmitted to a logical switch over a logical ISL to a logical switch that is connected through the base fabric, each data frame first has the IFR_header appended to the front of the frame, and then the Enc_header appended to front of the IFR_header. The encapsulation header allows the frame to be sent as a normal frame through the base fabric, and allows normal L2 switches to exist in the base fabric. The destination address in the encapsulation header is set to DRS address of the closest base logical switch to allow for further routing if the destination logical switch is not connected through the base fabric. The IFR header allows the frame to be matched to a particular logical switch once received by the destination switch. A simple example of a possible LF topology and a high-level abstraction of the data path and the frame can be seen in the FIGS. 24 and 25.

Figure 24:
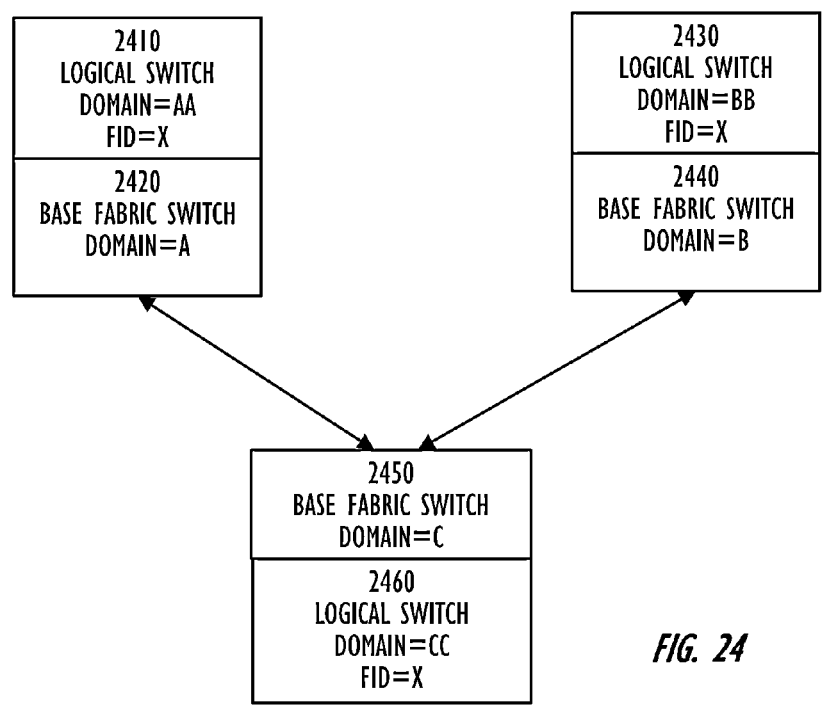
FIG. 24 is a block diagram illustrating one example of connecting multiple chassis using a virtual fabric.

In the example topology of FIG. 24, a logical switch 2410 has an FID of X. The logical switch is connected to the rest of virtual fabric X (logical switches 2460 and 2430) over LISLs connected via XISLs between base fabric switches 2420, 2450, and 2440, which are not part of the logical fabric X.

Figure 25:
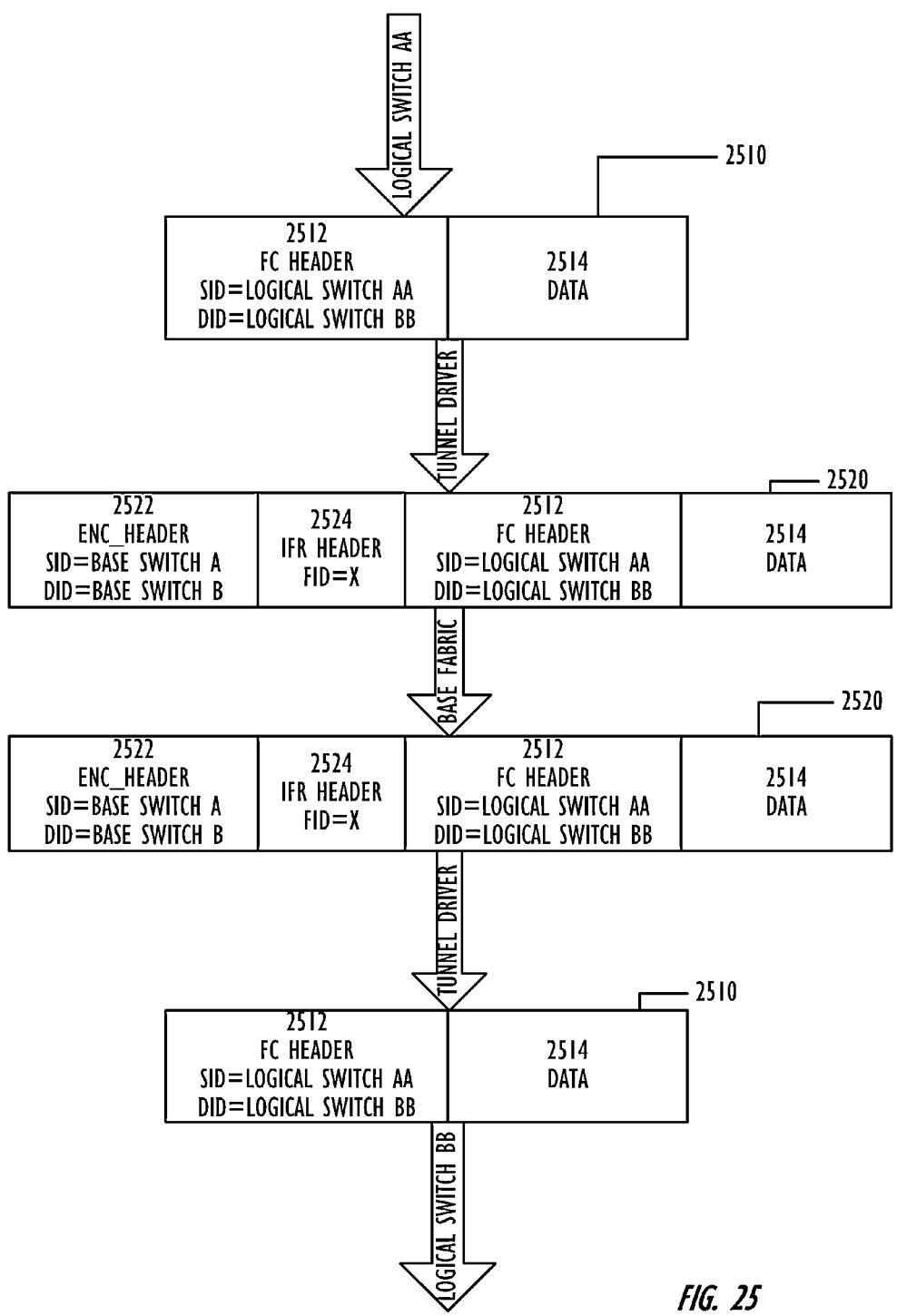
FIG. 25 is a block diagram illustrating one embodiment of frame header processing as a frame traverses the virtual fabric of FIG. 24.

Turning to FIG. 25, a frame 2510 from logical switch 2410 has a FC header 2512 indicating that the source is logical switch 2410, and the destination is logical switch 2430, and a payload 2514. The tunnel driver 1760 then encapsulates the original frame 2510, producing encapsulated frame 2520 by adding the IFR_header 2524 to indicate the virtual fabric associated with this frame (FID X in FIG. 25), and then adding Enc_header 2522, indicating that the source switch is base logical switch 2420, and destination switch is base logical switch 2440. Encapsulated frame 2520 is routed through the base fabric, in this example through base logical switch 2450. Upon receipt by base fabric switch 2440, the tunnel driver 1760 is invoked to decapsulate frame 2520, producing the original frame 2510 again, which is then passed to logical switch 2430.

Figure 26:
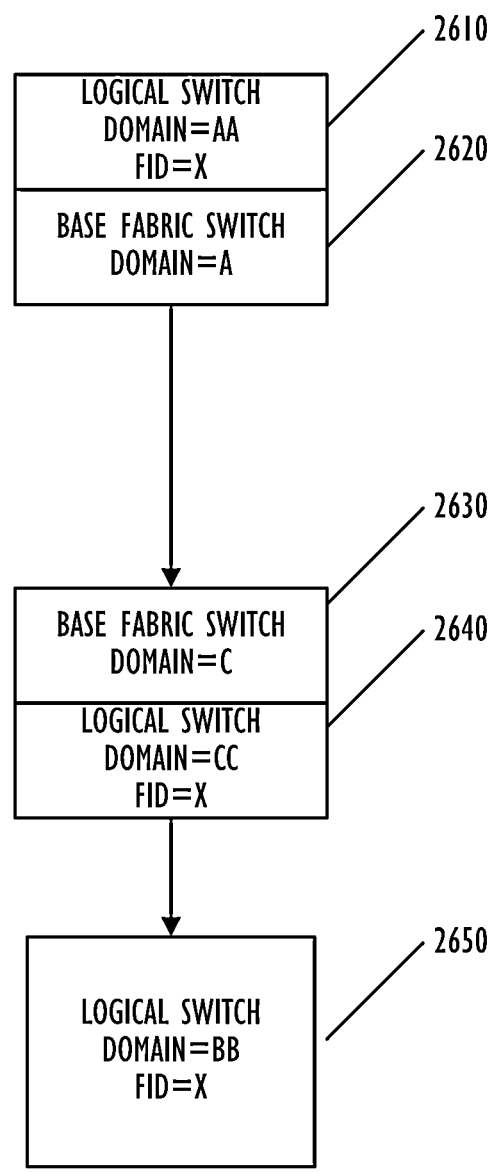
FIG. 26 is a block diagram illustrating another example of connecting multiple chassis using a virtual fabric.
Figure 27:
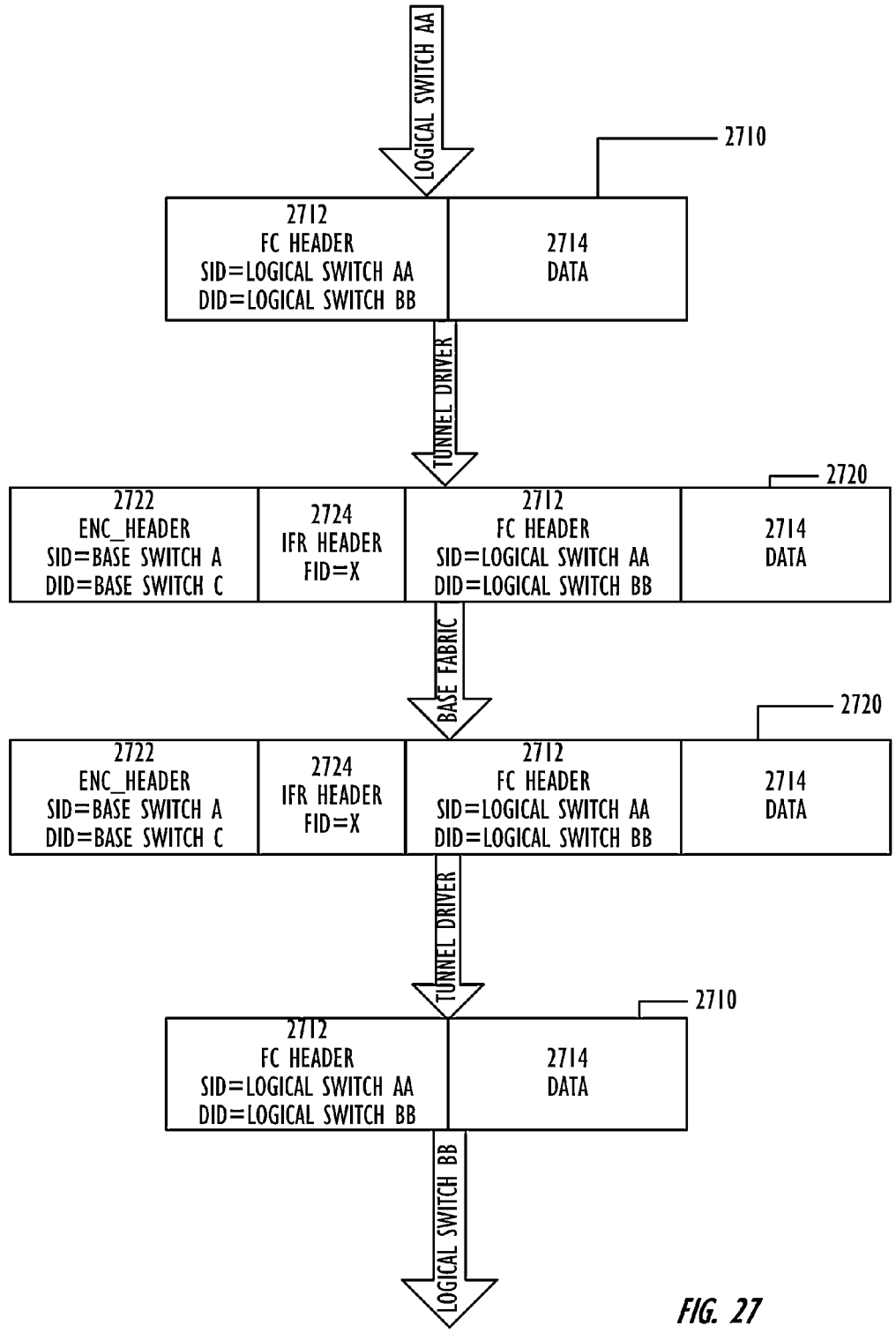
FIG. 27 is a block diagram illustrating one embodiment of frame header processing as a frame traverses the virtual fabric of FIG. 30.

In the situation where a logical destination switch does not have a base fabric partition on the local chassis, then the frame is sent to the closest base logical switch partition's DRS address and the hardware strips off the Enc_header and IFR_header and forwards the frame to the destination. FIGS. 26 and 27 illustrate a topology for this scenario and a high-level abstraction of the frame data flow.

In the example topology of FIG. 26, logical switch 2610 is part of virtual fabric X and is connected to the rest of the virtual fabric X by an LISL tunneled through an XISL connected between base fabric switches 2620 and 2630. Logical switch 2650, also part of virtual fabric X, is connected via a DISL to base logical switch 2630, and can be a legacy L2 switch that does not support virtual fabrics. As shown by FIG. 27, as in FIG. 25, the original frame 2710 is sent from logical switch 2610 with an FC header 2712, indicating the source is logical switch 2610 and the destination is logical switch 2650, and a payload 2714. As in FIG. 25, the tunnel driver 1760 adds an IFR_header 2724 indicating virtual fabric X, and an Enc_header 2722 indicating the source is base logical switch 2620 and the destination is base logical switch 2630, producing encapsulated frame 2720. The encapsulated frame 2720 is then routed through the base fabric to base logical switch 2630, which decapsulates the frame, and sends original frame 2710 on to logical switch 2650.

In some embodiments, the virtual fabric design allows for mapping VSAN ports to logical F_Ports, which are assigned to a logical switch, so each logical F_Port on a port can be mapped to a particular logical switch. The tunnel driver 1760 adds or removes a VFT header, as defined in the Fibre Channel Switch Fabric-4 (FC-SW-4) work draft standard, from VSAN capable ports and maps the frame to a logical F_Port. Basic frame flow examples can be seen in the FIGS. 28 and 29.

Figure 28:
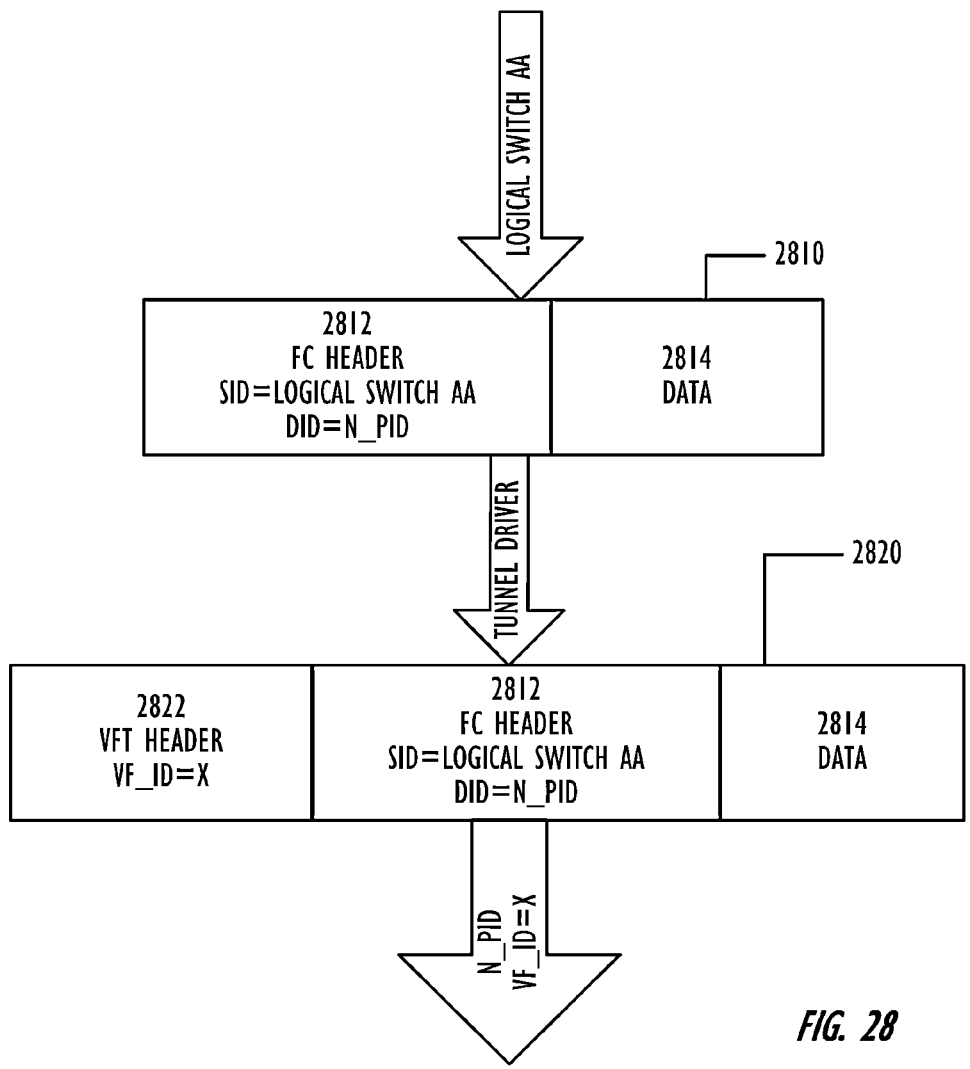
FIG. 28 is a block diagram illustrating an example frame flow for an outbound logical F port.
Figure 29:
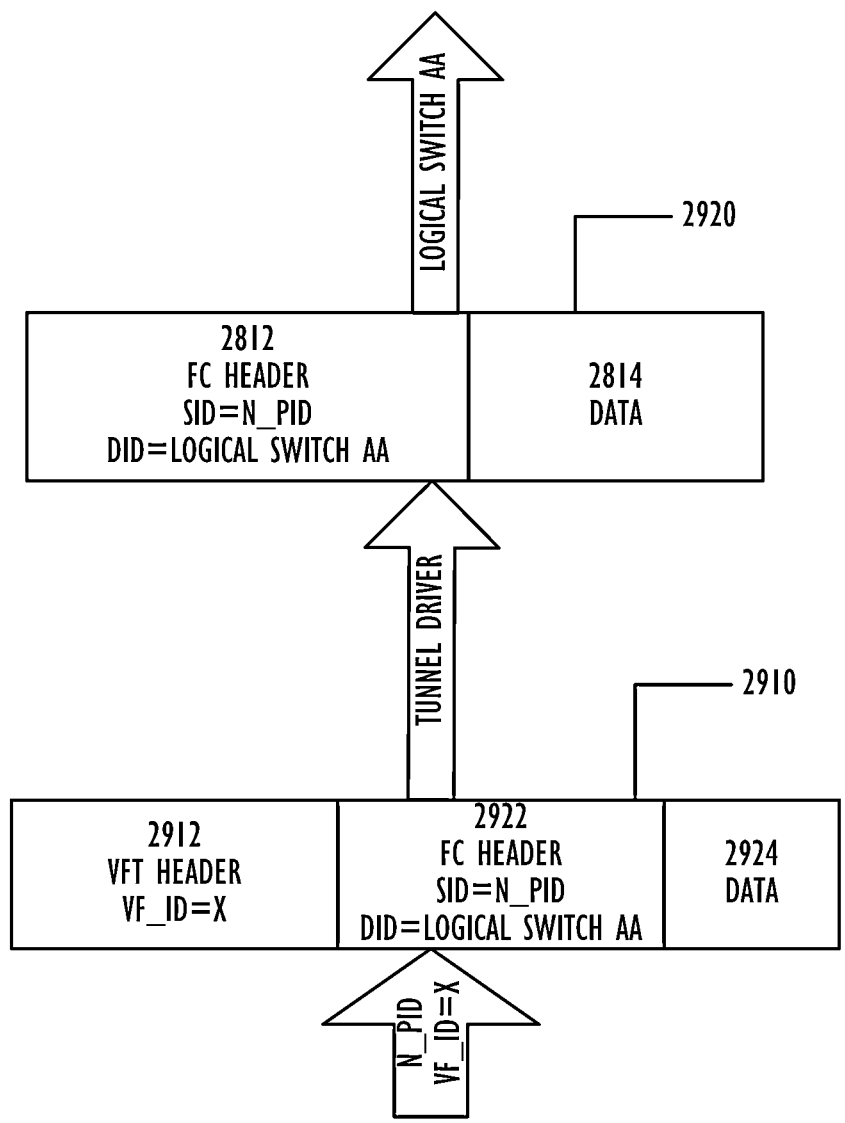
FIG. 29 is a block diagram illustrating an example frame flow for an inbound logical F port.

FIG. 28 illustrates an example frame flow for an outbound logical F port. A frame 2810 is sent from logical switch AA with FC header 2812 indicating a source of logical switch AA and a destination of N_PID. The frame 2810 is sent through the tunnel driver to add a VFT header 2822 indicating VF_ID of x, producing frame 2820. The frame 2820 is then sent over the logical F port for delivery. FIG. 29 illustrates an example frame flow for an inbound logical F port, which reverses the procedure of FIG. 28. Upon receipt of the encapsulated frame 2910, which includes a VFT header 2912 indicating VF_ID x, an FC header 2922, indicating the source is N_PID and the destination is logical switch AA, and a payload 2924. The tunnel driver 1760 decapsulates the frame 2910, producing frame 2920, with only the FC header 2922 and payload 2924, which can then be sent through the base fabric to the logical switch AA for delivery.

Figure 31:
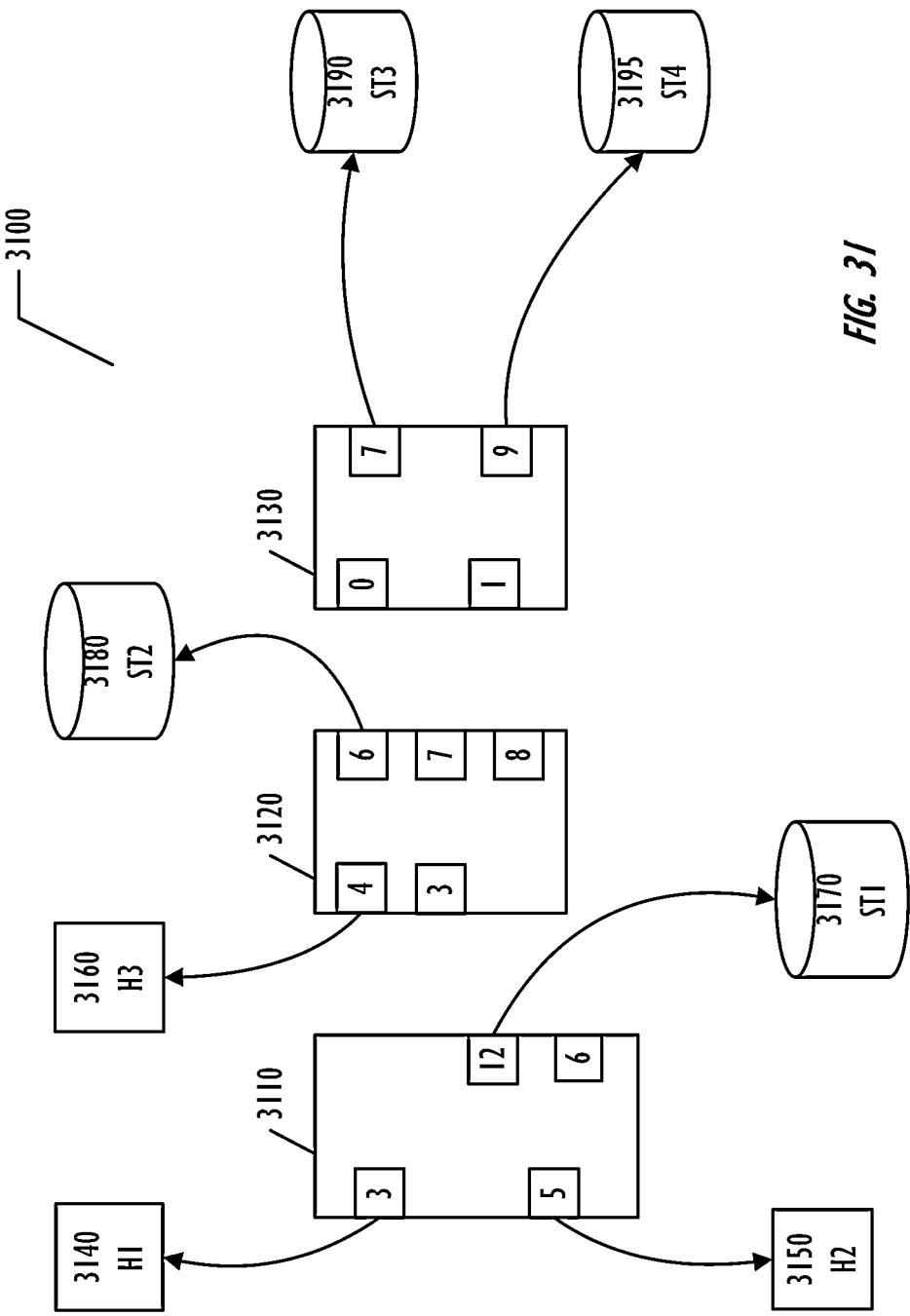
FIG. 31 is a block diagram illustrating a network of switch chassis and end-user devices according to one embodiment.
Figure 32:
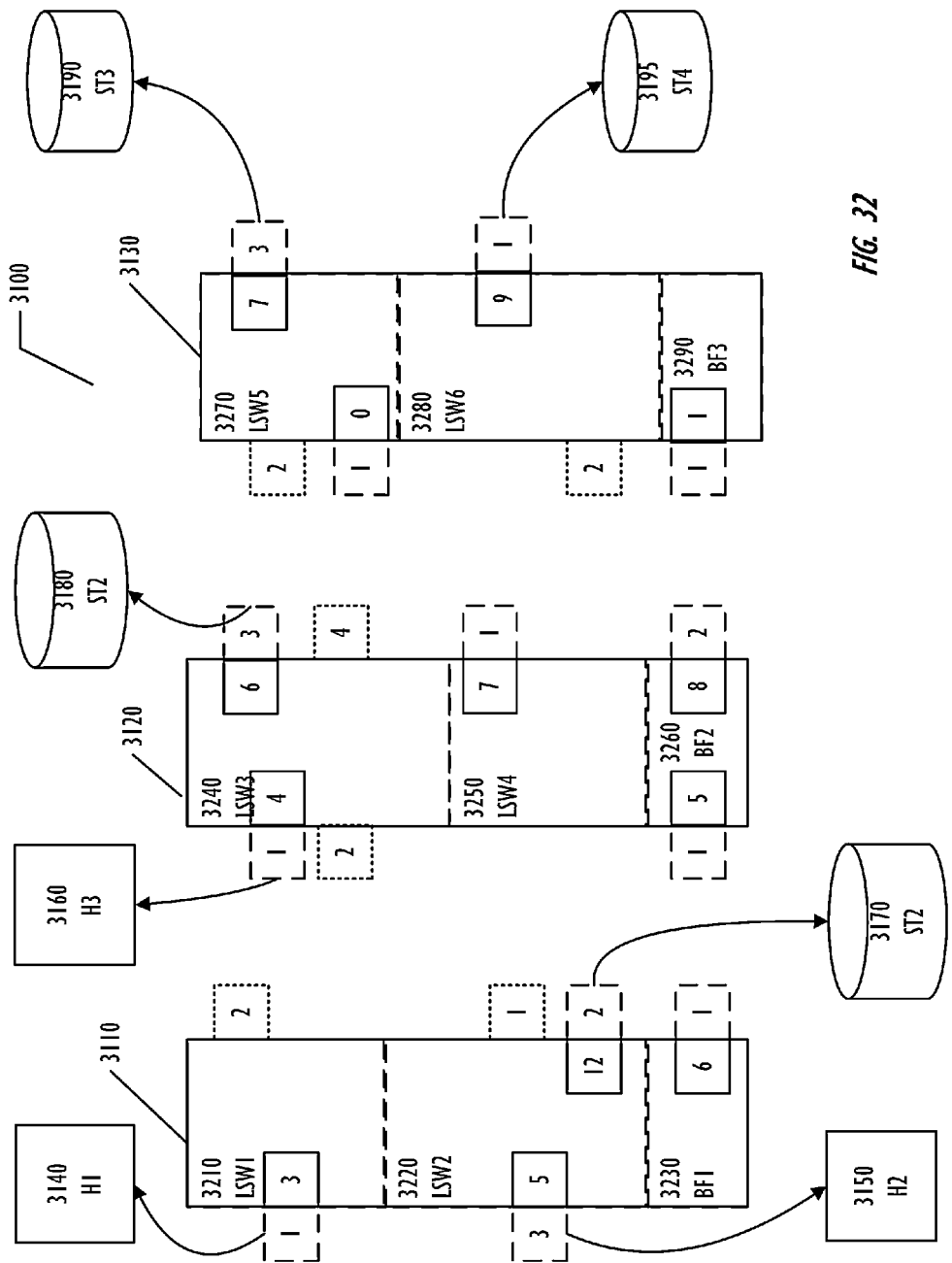
FIG. 32 is a block diagram illustrating the network of FIG. 31 with the switch chassis partitioned into logical switches according to one embodiment.
Figure 33:
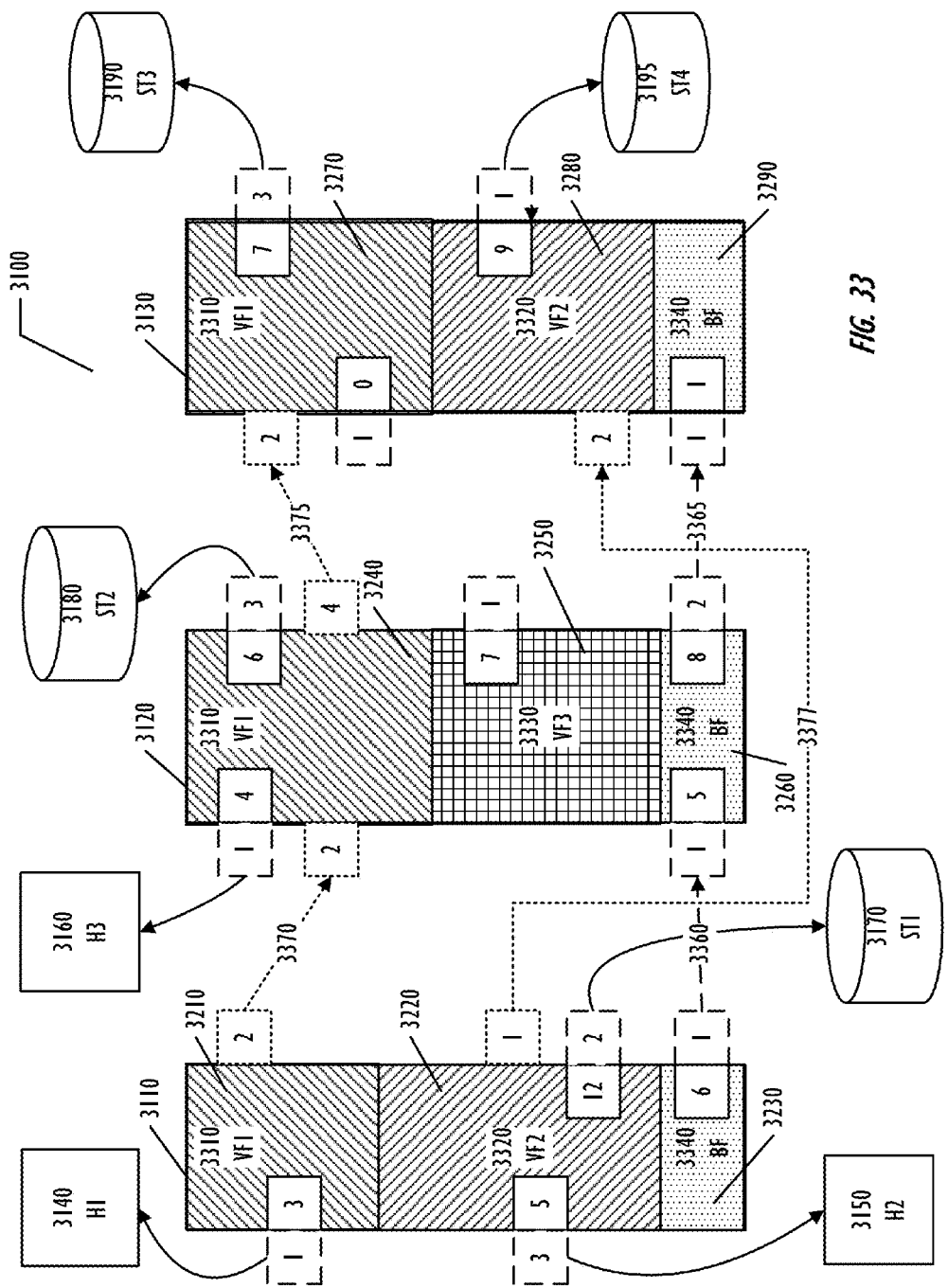
FIG. 33 is a block diagram illustrating the network of FIG. 31 with the assignment of logical switches to virtual fabrics and inter-switch links connecting the virtual fabric.

Turning to FIGS. 31-33, we now put all of the pieces together to show an example of how a network 3100 of three physical switches 3110, 3120, and 3130 can be partitioned and connected into multiple virtual fabrics. FIG. 31 illustrates the physical switches 3110, 3120, and 3130, and end devices 3140-3195. Ports 3, 5, 6, and 12 are illustrated as defined in switch chassis 3110. Host 3140 (H1) is connected to port 3, host 3150 (H2) is connected to port 5, and storage system 3170 (ST1) is connected to port 12. Switch chassis 3120 is shown with ports 3-4 and 6-8, with host 3160 (H3) connected to port 4 and storage system 3180 (ST2) connected to port 6. Finally, switch 3130 is shown with ports 0, 1, 7, and 9, with storage system 3190 (ST3) connected to port 7 and storage system 3195 (ST4) connected to port 9. Other ports can be defined in switch chassis 3110-3130, but are omitted for clarity of the drawing. Although three switch chassis are shown in FIGS. 31-33, any desirable number of switch chassis can be connected into a switch network according to the disclosed embodiments.

FIG. 32 illustrates partitioning the three physical switches 3110-3130, and assigning ports to the logical switches. Switch chassis 3110 is partitioned into logical switches 3210 (LSW1), 3220 (LSW2), and 3230 (BF1). Logical switch 3230 is designated as a base switch in the partition configuration. Switch chassis 3120 is partitioned into logical switches 3240 (LSW3), 3250 (LSW4), and 3260 (BF2), with logical switch 3260 designated as a base switch. Switch chassis 3130 is partitioned into logical switches 3270 (LSW5), 3280 (LSW6), and 3290 (BF3), with logical switch 3290 designated as a base switch. The number of logical switches shown in FIG. 32 are by way of example and illustrative only, and although each of the switch chassis 3110-3130 are shown as partitioned into three logical switches, as disclosed above, any desired number of logical switches can be defined in a switch chassis. No significance should be given to the arrangement of the logical switch assignments in FIG. 32. For example, any of the logical switches of a partitioned switch chassis can be designated as a base switch.

In addition to the logical switch partitioning, FIG. 32 illustrates an example of assigning ports to the logical switches, with the port number assignments in the logical switches shown in dashed lines when associated with a port of the physical switch chassis, and in dotted lines when a logical port. Logical switch 3210 is assigned port 3 of the switch chassis 3110, with port 3 assigned as port 1 of the logical switch 3210. Similarly, port 5 of the switch chassis 3110 is assigned to logical switch 3220 as port 3, port 12 is assigned to logical switch 3220 as port 2, and port 6 is assigned to base switch 3230 as port 1. As with the port number assignments of the switch chassis, the port number assignments of the logical switches are illustrative and by way of example only. In addition, logical port 2 is defined in logical switch 3210 and logical port 1 is defined in logical switch 3220. As shown in FIG. 32 and described above, the logical ports are not associated with a physical port of the switch chassis 3110.

Similarly, in switch chassis 3120, physical ports 4 and 6 are assigned to ports 1 and 3, respectively, of logical switch 3240. Two logical ports 2 and 4 are also defined in logical switch 3240. Physical port 7 of the switch chassis is assigned as port 1 of logical switch 3250. Physical ports 5 and 8 are assigned as ports 1 and 2, respectively, in base switch 3260. Likewise, in switch chassis 3130, ports 0 and 7 are assigned to logical switch 3270 as ports 1 and 3, respectively, port 9 of the chassis 3130 is assigned to logical switch 3280 as port 1, and port 1 of the chassis 3130 is assigned to base switch 3290 as port 1. In each of logical switches 3270 and 3280, a logical port 2 is assigned to the logical switch, with no associated physical port.

As illustrated in the example partitioning and assignments of FIG. 32, port numbers assigned to logical switches do not necessarily have the same port number assignment as the port number for the switch chassis, and different logical switches may have ports defined with the same port number as other logical switches in the same chassis. Where end devices are attached to physical ports, those logical switches will process traffic to and from the end device using the port number assignment of the logical port.

Turning to FIG. 33, we see an assignment of the logical switches to virtual fabrics, and inter-switch links connecting the various logical switches. Logical switches 3210, 3240, and 3270 are all assigned to virtual fabric 3310 (VF1), logical switches 3220 and 3280 are assigned to virtual fabric 3320 (VF2), logical switch 3250 is assigned to virtual fabric 3330 (VF3), and base switches 3230, 3260, and 3290 are assigned to base fabric 3340 (BF). Note that no logical switches are assigned to virtual fabric 3330 (VF3) in switch chassis 3110 and 3130.

In addition to the virtual fabrics, FIG. 33 illustrates an example of various inter-switch links, with XISLs shown as dashed lines, and LISLs shown as dotted lines. XISLs 3360 and 3265 connect base switches 3230 and 3260, with XISL 3360 connecting port 1 of base switch 3230 to port 1 of base switch 3260, and XISL 3365 connecting port 2 of base switch 3260 to port 1 of base switch 3290. These XISLs are used for transporting data for the LISLs 3370, 3375, and 3377 defined in the network 3100. LISL 3370 connects logical port 2 of logical switch 3210 to logical port 2 of logical switch 3240, LISL 3375 connects logical port 4 of logical switch 3240 to logical port 2 of logical switch 3270, and LISL 3377 connects logical port 1 of logical switch 3220 to logical port 2 of logical switch 3320. Additional LISLs can be defined to complete a full mesh of the virtual fabric 3310 if desired. As explained in more detail above, LISLs 3370, 3375, and 3377 use services provided by the base switches 3230, 3260, and 3290 to tunnel data across XISLs 3360 and 3365. Note that although logical switch 3250 is part of the same physical chassis 3120, because it is assigned to virtual fabric 3330 (VF3), and is not part of virtual fabric 3310 or 3320, none of the traffic passing through LISLs 3370, 3375, and 3377 is seen by logical switch 3250. Likewise, none of the traffic for virtual fabric 3310 is seen by the logical switches of virtual fabric 3320 and vice versa. No DISLs are defined in the illustration of FIG. 33.

Thus, for example, if host 3150 needs data from storage system 3195, that data will traverse the connection from storage system 3195 to port 1 of logical switch 3280, then go via 3377 from port 2 of logical switch 3280 to port 1 of logical switch 3220 LISL and finally via port 3 to host 3150. As described in detail above in the discussion of FIGS. 24 and 25, the traffic between storage system 3195 and host 3150 for LISL 3377 is routed across XISLs 3360 and 3365 using the additional headers added to the frames. The logical switch 3220 puts FC headers on frames that specify the source as logical switch 3220 and destination as logical switch 3280, then passes the frame to the base switch 3230. The tunnel driver 1760 of base switch 3230 encapsulates frames going to logical switch 3220 to include an ENC header specifying source of base switch 3230 and a destination of base switch 3290, and an IFR header specifying the fabric ID of virtual fabric 3320. The frames are then routed across the base fabric 3340. Even though the frames pass through base switch 3260 in route to base switch 3290, no devices connected to base switch 3260 sees that traffic. Upon receipt by the base switch 3290, the frames are decapsulated by the tunnel driver 1760 of base switch 3290 to remove the ENC and IFR headers, before delivering the frames to logical switch 3280.

Similarly, if host 3140 requests data from storage system 3180, the request and response can go over LISL 3370, traversing XISL 3360. The tunnel drivers 1760 of base switches 3230 and 3260 encapsulate and decapsulate the frames with ENC headers specifying the source and destination base switches and IFR headers specifying virtual fabric 3310.

If host 3160 requests data from storage system 3190, the request and response will go over LISL 3375, traversing XISL 3365. The tunnel drivers 1760 of base switches 3260 and 3290 encapsulate and decapsulate the frames with ENC headers specifying the source and destination base switches and IFR headers specifying virtual fabric 3310.

If host 3160 needs data from storage system 3190, the traffic will traverse LISL 3375 and XISL 3365, but not XISL 3360. As before, the tunnel drivers of base switches 3260 and 3290 will encapsulate and decapsulate frames with ENC headers specifying the source and destination base switches 3260 and 3290, and an IFR header specifying virtual fabric 3310.

Storage system 3195 is invisible to host 3140, as is any other end-device connected to a logical switch assigned to a different virtual fabric than virtual fabric 3310.

Although some of the above description is written in terms of software or firmware drivers, the encapsulation and decapsulation can be performed in hardware of the ASIC instead of software or firmware.

In one embodiment, end devices and logical switches may be in only a single virtual fabric.

Figure 34:
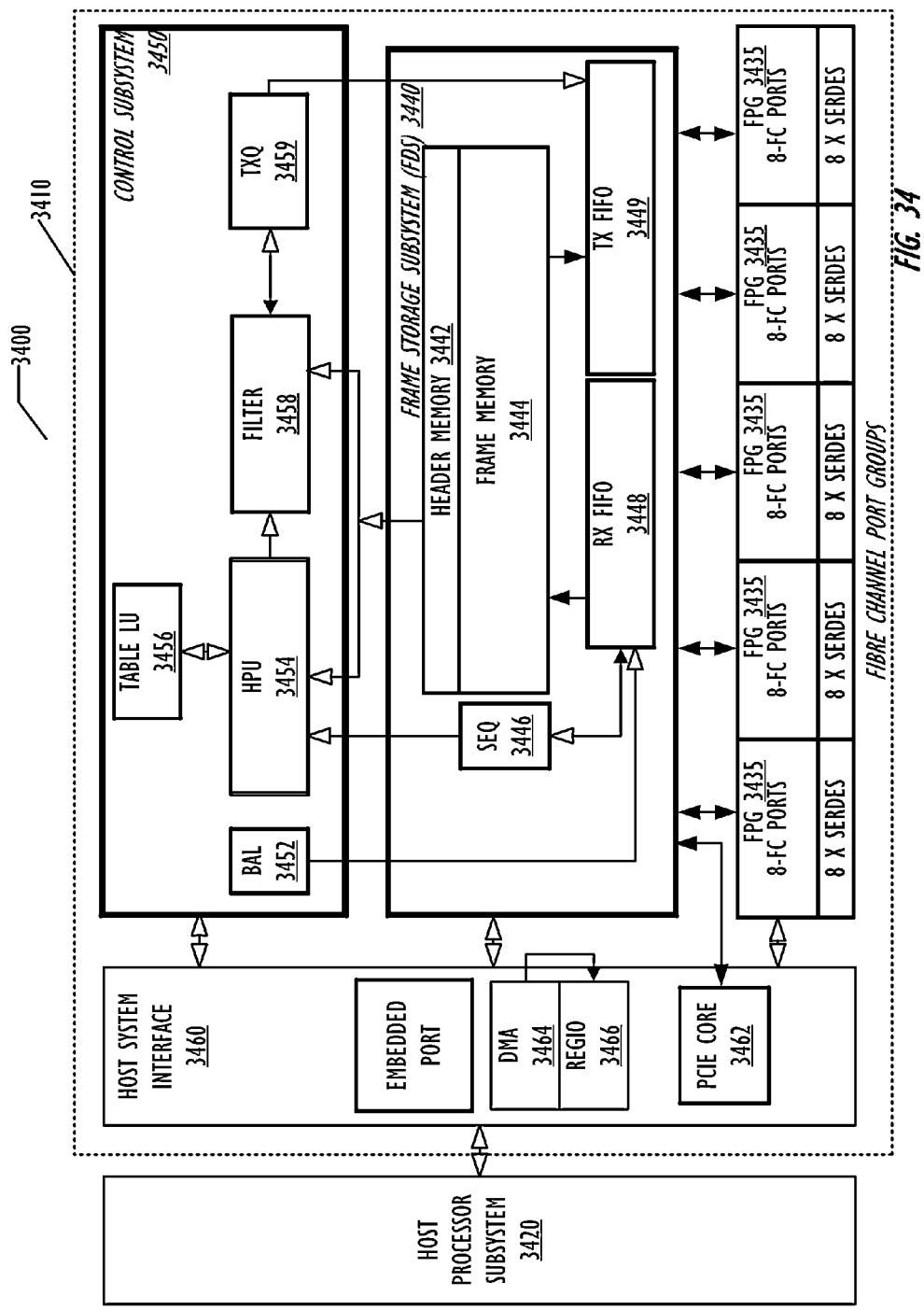
FIG. 34 is a block diagram illustrating a hardware implementation for partitioning a network switch into multiple logical switches according to one embodiment.

In one embodiment illustrated in FIG. 34, the functionality for partitioning a network switch into a multiple logical switches described above is implemented in hardware as a 40-port Fibre Channel switch ASIC 3410 that is combinable with a host processor subsystem 3420 to provide a complete 40-port Fibre Channel switch chassis 3400. Multiple ASICs 3410 can be arranged in various topologies to provide higher port count, modular switch chassis.

The ASIC 3410 comprises four major subsystems at the top-level as shown in FIG. 34: A Fiber channel Protocol Group Subsystem 3430, a Frame Storage Subsystem 3440, a Control Subsystem 3450, and a Host System Interface 3460.

Some features of the ASIC 3410 that are not relevant to the current discussion have been omitted for clarity of the drawing.

The Fibre channel Protocol Group (FPG) Subsystem 3430 comprises 5 FPG blocks 3435, each of which contains 8 port and SERDES logic blocks to support a total of 40 E, F, and FL ports.

The Frame Data Storage (FDS) Subsystem 3440 contains the centralized frame buffer memory and associated data path and control logic for the ASIC 3410. The frame memory is separated into two physical memory interfaces: a header memory 3442 to hold the frame header and a frame memory 3444 to hold the payload. In addition, the FDS 3440 includes a sequencer 3446, a receive FIFO buffer 3448 and a transmit buffer 3449.

The Control Subsystem 3450 comprises a Buffer Allocation unit (BAL) 3452, a Header Processor Unit (HPU) 3454, a Table Lookup Unit (Table LU) 3456, a Filter 3458, and a Transmit Queue (TXQ) 3459. The Control Subsystem 3450 contains the switch control path functional blocks. All arriving frame descriptors are sequenced and passed through a pipeline of the HPU 3454, filtering blocks 3458, until they reach their destination TXQ 3459. The Control Subsystem 3450 carries out L2 switching, FCR, LUN Zoning, LUN redirection, Link Table Statistics, VSAN routing and Hard Zoning.

The Host System Interface 3460 provides the host subsystem 3420 with a programming interface to the ASIC 3410. It includes a Peripheral Component Interconnect Express (PCIe) Core 3462, a DMA engine 3464 to deliver frames and statistics to and from the host, and a top-level register interface block 3466. As illustrated in FIG. 34, the ASIC 3410 is connected to the Host Processor Subsystem 3420 via a PCIe link controlled by the PCIe Core 3462, but other architectures for connecting the ASIC 3410 to the Host Processor Subsystem 3420 can be used.

Some functionality described above can be implemented as software modules in an operating system running in the host processor subsystem 3420. This typically includes functionality such as the partition manager 1620 and the LFM 1610 that allow creation and independent management of the logical switches that are defined for the ASIC 3410, including user interface functions, such as a command line interface for management of a logical switch.

Serial data is recovered by the SERDES of an FPG block 3435 and packed into ten (10) bit words that enter the FPG subsystem 3430, which is responsible for performing 8 b/10 b decoding, CRC checking, min and max length checks, disparity checks, etc. The FPG subsystem 3430 sends the frame to the FDS subsystem 3440, which transfers the payload of the frame into frame memory and the header portion of the frame into header memory. The location where the frame is stored is passed to the control subsystem, and is used as the handle of the frame through the ASIC 3410. The Control subsystem 3450 reads the frame header out of header memory and performs routing, classification, and queuing functions on the frame. Frames are queued on transmit ports based on their routing, filtering and QoS. Transmit queues de-queue frames for transmit when credits are available to transmit frames. When a frame is ready for transmission, the Control subsystem 3450 de-queues the frame from the TXQ for sending through the transmit FIFO back out through the FPG 3430.

The Header Processing Unit (HPU) 3454 performs header HPU processing with a variety of applications through a programmable interface to software, including (a) Layer2 switching, (b) Layer3 routing (FCR) with complex topology, (c) Logical Unit Number (LUN) remapping, (d) LUN zoning, (e) Hard zoning, (f) VSAN routing, (g) Selective egress port for QoS, and (g) End-to-end statistics.

Figure 35:
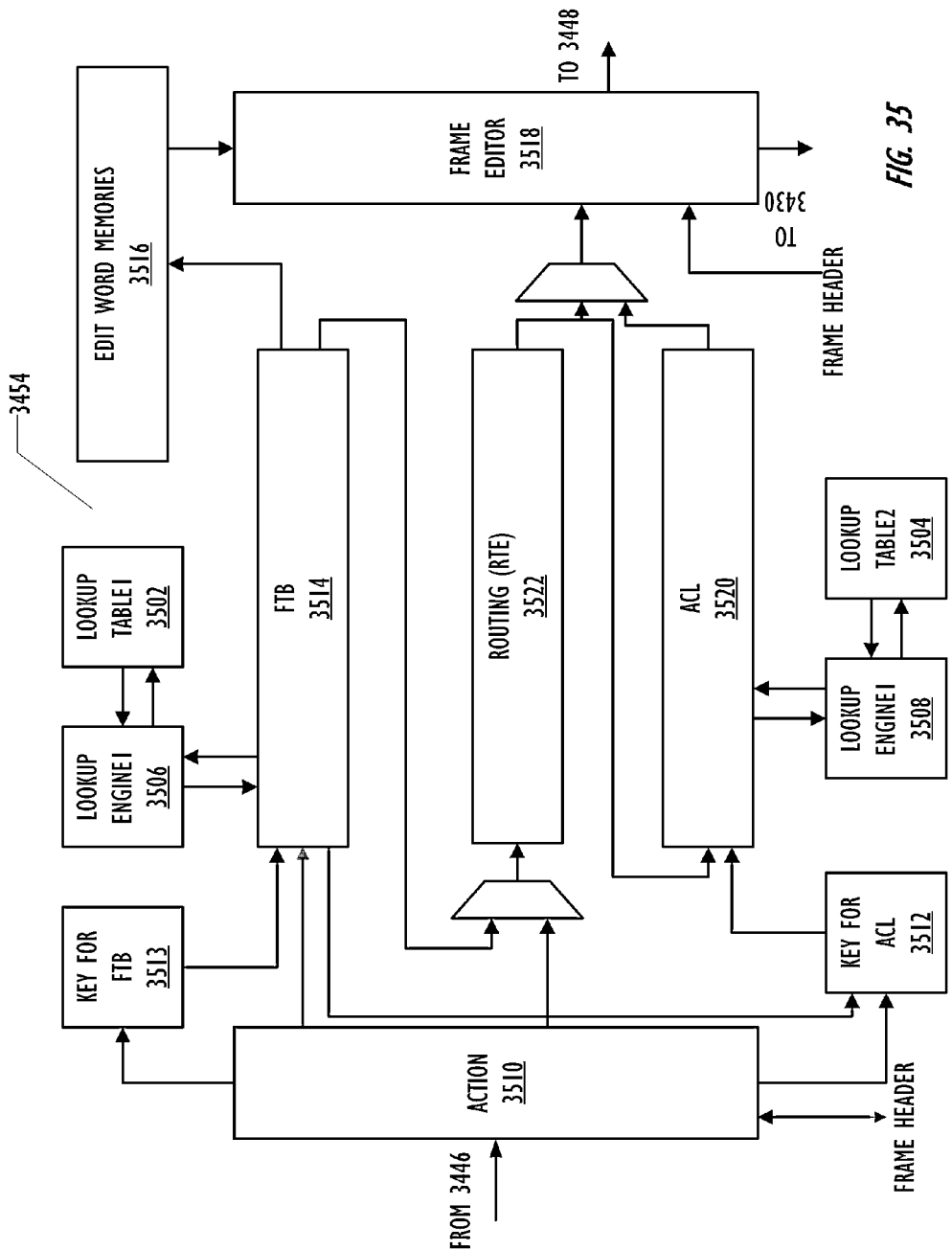
FIG. 35 is a block diagram illustrating a header processing unit of the embodiment of FIG. 34.

FIG. 35 is a block diagram illustrating one embodiment of the HPU 3454 of FIG. 34. To achieve per frame based processing with different applications, two lookup tables (3502 and 3504) are provided each with its own search engine (3506 and 3508, respectively) that performs key match search into different segments for different application applied to the frame. One larger lookup table (3502) fits for all applications except the case of hard zoning, for which entries are stored in the other, smaller lookup table (3504).

The application type is determined by frame's DID upon receiving. The HPU 3454 then picks up a key from the frame based on type of frame (L2 or L3) and application, looks for a key match from the appropriate lookup table and processes lookup results after the search. Some applications can be mixed with another as a combined processing. For example, if the frame's DID is destined to a remote fabric after remapping, then the second lookup to translate the frame's DID is performed by a loop-back mechanism within the HPU block 3454.

The HPU 3454 is partitioned into six sub-blocks that serve four major functions including application determination, table lookup, routing and frame editing. FIG. 35 is block diagram illustrating these sub-blocks according to one embodiment. Upon receiving a frame, the action block (ACT) (3510) retrieves a frame header from switch memory and determines the type of application, and writes key information to key memory for lookup 3513. Then a Frame Transformation Block 3514 processes lookup results and writes edit words into edit memories 3516 for later use by a frame editor (FED) 3518. If hard zoning is required, it is passed to the advanced performance monitoring (ACL) block 3520 after routing is done. Depending on type of application, it may or may not require frame editing by the FED 3518. If no lookup is required, the frame is passed directly to the routing block (RTE) 3522 for normal Layer2 switching, bypassing frame editing at the end.

The basic function of the ACT block 3510 is to process frame requests received from the Sequencer (SEQ) 3446, capture relevant fields from the frame header, perform a lookup in the Action Table and forward the information to either the RTE 3522 or the FTB 3514.

The ACT block 3510 receives frame processing requests from the SEQ 3446. The ACT block 3510 then reads the frame header from the FDS, using the RxPort and DID fields of the frame header to determine the type of processing required. If the L3 level (e.g. FCR) processing is required, then the ACT block 3510 forwards relevant frame header information to the FTB block 3514. Otherwise, the information is forwarded to the RTE block 3522. Frame information needed for Hard Zoning is also forwarded to the ACL block 3520 by passing a key information to a key memory for the ACL block 3512.

The ACT block 3510 also performs Extended Link Service (ELS)/Basic Link Service (BLS) frame classification and forwards the required information to the FTB 3514 and RTE 3522.

In summary, the HPU 3454 provides hardware capable of encapsulating and routing frames across inter-switch links that are connected to the ports 3435 of the ASIC 3410, including the transport of LISL frames that are to be sent across an XISL. The HPU 3454 performs frame header processing and Layer 3 routing table lookup functions using routing tables where routing is required, encapsulating the frames based on the routing tables, and routing encapsulated frames. The HPU 3454 can also bypass routing functions where normal Layer2 switching is sufficient.

Thus, the ASIC 3410 can use the HPU 3454 to perform the encapsulation, routing, and decapsulation, by adding or removing IFR headers to allow frames for a LISL to traverse an XISL between network switches in a virtual fabric as described above and illustrated in FIGS. 25 and 27 at hardware speeds. Similarly, VSAN traffic can be routed by the HPU 3454's encapsulation and decapsulation of frames with VFT headers, as described above and illustrated in FIGS. 28 and 29.

In conclusion, the embodiments described above provide the ability to partition a chassis into a plurality of logical switches, then assign ports of the physical switch fabric to the logical switches. Virtual fabrics can then be defined across multiple chassis, with inter-switch links connecting the logical switches in the multiple chassis. A particular logical switch in each partitioned chassis is designated as base switch, and collections of base switches form base virtual fabrics.

The links that connect switches in the virtual fabrics can be DISLs connecting physical ports that are assigned to the logical switches, XISLs that connect physical ports of the base switches, and LISLs that connect logical ports defined in the logical switches. The LISLs have no physical connection between endpoints of their own, but tunnel through the XISLs of their associated base switches.

Thus, devices can be connected to separate physical chassis, but behave as if they are connected to a single virtual chassis. This allows connecting multiple collections of hosts and storage units in a flexible, convenient, and manageable way, while maintaining separation of traffic, so that each collection of devices in a virtual fabric is invisible to the devices associated with the other virtual fabrics, even when using a common physical XISL link for the transport of traffic tunneled through the base fabric logical switches.

LISLs that connect logical ports of the logical switch by tunneling through XISLs that physically connect base switches of the base fabric.

While certain example embodiments have been described in details and shown in the accompanying drawings, it is to be understood that such embodiments are merely illustrative of and not devised without departing from the basic scope thereof, which is determined by the claims that follow.

We claim:

1. A method of connecting logical switches in a network, comprising:
   partitioning a first switch into a first plurality of logical switches;
   partitioning a second switch into a second plurality of logical switches;
   creating a first physical inter-switch link between a first logical switch of the first plurality of logical switches and a third switch;
   creating a second physical inter-switch link between a second logical switch of the second plurality of logical switches and the third switch;
   creating a logical inter-switch link between a first logical port of a third logical switch of the first plurality of logical switches and a second logical port of a fourth logical switch of the second plurality of logical switches; and
   routing traffic for the logical inter-switch link over the first physical inter-switch link and the second physical inter-switch link, transparent to the third switch,
   wherein the first logical port of the third logical switch is not mapped to a physical port of the first switch, and
   wherein the second logical port of the fourth logical switch is not mapped to a physical port of the second switch.

2. The method of claim 1,
   wherein the third switch is not partitionable into logical switches.

3. The method of claim 1,
   wherein the first logical switch, the second logical switch, and the third switch are assigned to a first switch fabric, and
   wherein the third logical switch and the fourth logical switch are assigned to a second switch fabric, different from the first switch fabric.

4. The method of claim 3, wherein no other logical switch of the first plurality of logical switches is assigned to the first switch fabric or the second switch fabric.

5. The method of claim 1, wherein routing comprises:
   encapsulating frames transmitted across the logical inter-switch link, identifying the first logical switch as a source switch and the second logical switch as a destination switch; and
   routing frames across the first inter-switch link and the second inter-switch link based on the source switch and the destination switch.

6. The method of claim 5, wherein encapsulating comprises:
   inserting an inter-fabric routing header specifying a virtual fabric identifier associated with the third logical switch and the fourth logical switch; and
   inserting an encapsulation extended header specifying the first logical switch as a source switch and the second logical switch as a destination switch.

7. The method of claim 1, further comprising:
   assigning the first logical switch and the third switch to a first switch fabric,
   wherein no other logical switch of the first switch is assigned to the first switch fabric.

8. The method of claim 7, further comprising:
   assigning a second logical switch of the second plurality of logical switches to the first switch fabric,
   wherein no other logical switch of the second switch is assigned to the first switch fabric.

9. A network of switches, comprising:
   a first network switch and a second network switch, each comprising a plurality of logical switches;
   a transit network switch,
   a logical inter-switch link defined between a first logical port of a third logical switch of the plurality of logical switches of the first network switch and a first logical port of a fourth logical switch of the plurality of logical switches of the second network switch;
   a first extended inter-switch link, connected between a first logical switch of the plurality of logical switches of the first network switch and the transit network switch, configured to provide transport of data for the logical inter-switch link between the first network switch and the transit network switch, transparent to the transit network switch; and
   a second extended inter-switch link, connected between a second logical switch of a plurality of logical switches of the second network switch and the transit network switch, configured to provide transport of data for the logical inter-switch link between the second network switch and the transit network switch, transparent to the transit network switch, wherein the first logical port of the third logical switch is not mapped to a physical port of the first network switch, and wherein the second logical port of the fourth logical switch is not mapped to a physical port of the second network switch.

10. The network of switches of claim 9, wherein the transit network switch is a legacy network switch, not partitionable into a plurality of logical switches.

11. The network of switches of claim 9, wherein the first network switch further comprises:
  a processor;
  a storage medium, coupled to the processor, on which is stored software, which when executed by the processor causes the processor to perform actions comprising:
    establishing the first extended inter-switch link between the first logical switch of the first network switch and the transit network switch,
    establishing the logical inter-switch link; and
    generating routing data for routing traffic for the logical inter-switch link across the first extended inter-switch link.

12. The network of switches of claim 11, wherein routing traffic for the logical inter-switch link across the inter-switch link comprises:
  encapsulating frames transmitted across the logical inter-switch link, identifying the first logical switch of the first network switch as a source logical switch and the second logical switch of the second network switch as a destination logical switch; and
  routing frames across the first extended inter-switch link based on the source switch and the destination switch.

13. The network of switches of claim 11, wherein encapsulating frames comprises:
  inserting an inter-fabric routing header specifying a virtual fabric identifier associated with the source logical switch and the destination logical switch; and
  inserting an encapsulation extended header specifying the source logical switch and the destination logical switch.

14. A non-transitory computer readable medium on which is stored software for managing a network switch, the software for instructing a processor of the network switch to perform actions comprising:
  partitioning a first switch into a first plurality of logical switches;
  partitioning a second switch into a second plurality of logical switches; and
  creating a first physical inter-switch link between a first logical switch of the first plurality of logical switches and a third switch;
  creating a second physical inter-switch link between a second logical switch of the second plurality of logical switches and the third switch;
  creating a logical inter-switch link between a first logical port of a third logical switch of the first plurality of logical switches and a second logical port of a fourth logical switch of the second plurality of logical switches; and
  routing traffic for the logical inter-switch link over the first physical inter-switch link and the second physical inter-switch link, transparent to the third switch,
  wherein the first logical port of the third logical switch is not mapped to a physical port of the first switch, and
  wherein the second logical port of the fourth logical switch is not mapped to a physical port of the second switch.

15. The computer readable medium of claim 14, wherein the third switch is not partitionable into logical switches.

16. The computer readable medium of claim 15, wherein routing comprises:
  encapsulating frames transmitted across the logical inter-switch link, identifying the first logical switch as a source switch and the second logical switch as a destination switch; and
  routing frames across the first inter-switch link and the second inter-switch link based on the source switch and the destination switch.

17. The computer readable medium of claim 16, wherein encapsulating comprises:
  inserting an inter-fabric routing header specifying a virtual fabric identifier associated with the third logical switch and the fourth logical switch; and
  inserting an encapsulation extended header specifying the first logical switch as a source switch and the second logical switch as a destination switch.

18. The computer readable medium of claim 14, the software for instructing a processor of the network switch to perform actions further comprising:
  assigning each of the first plurality of logical switches to a different virtual fabric of a plurality of virtual fabrics; and
  assigning the third switch to the same virtual fabric as the first logical switch.

* * * * *